United States Patent
Taniyama et al.

(10) Patent No.: US 9,153,278 B2
(45) Date of Patent: Oct. 6, 2015

(54) STORAGE SYSTEM AND CONTROL APPARATUS

(71) Applicant: FUJITSU LIMITED, Kawasaki-shi, Kanagawa (JP)

(72) Inventors: Yukio Taniyama, Yokohama (JP); Hiroaki Nishijo, Kawasaki (JP); Kazuki Sasaki, Kawasaki (JP); Kenji Uchiyama, Kawasaki (JP); Yusuke Inai, Kawasaki (JP)

(73) Assignee: FUJITSU LIMTED, Kawasaki (JP)

(*) Notice: Subject to any disclaimer, the term of this patent is extended or adjusted under 35 U.S.C. 154(b) by 0 days.

(21) Appl. No.: 14/614,455

(22) Filed: Feb. 5, 2015

(65) Prior Publication Data

US 2015/0243316 A1 Aug. 27, 2015

(51) Int. Cl.
*G11B 15/02* (2006.01)
*G11B 15/05* (2006.01)
*G11B 7/24094* (2013.01)
*G11B 20/10* (2006.01)
*G06F 3/06* (2006.01)
*G11B 19/12* (2006.01)

(52) U.S. Cl.
CPC ............... *G11B 15/02* (2013.01); *G11B 15/05* (2013.01); *G06F 3/0619* (2013.01); *G06F 3/0686* (2013.01); *G11B 7/24094* (2013.01); *G11B 19/122* (2013.01); *G11B 2020/10879* (2013.01)

(58) Field of Classification Search
None
See application file for complete search history.

(56) References Cited

U.S. PATENT DOCUMENTS

| 5,668,950 | A | 9/1997 | Kikuchi et al. | |
| 2001/0016904 | A1* | 8/2001 | Hall | ................................ 713/1 |

FOREIGN PATENT DOCUMENTS

| JP | 7-319810 | 12/1995 |
| JP | 2000-40109 | 2/2000 |

OTHER PUBLICATIONS

Patent Abstracts of Japan, Publication No. 07-319810, published Dec. 8, 1995.
Patent Abstracts of Japan, Publication No. 2000-040109, published Feb. 8, 2000.

* cited by examiner

*Primary Examiner* — Wayne Young
*Assistant Examiner* — Brian Butcher
(74) *Attorney, Agent, or Firm* — Staas & Halsey LLP

(57) ABSTRACT

A storage system includes a storage apparatus, a control apparatus, and a host apparatus. The storage apparatus includes a recording medium. The control apparatus includes a detection unit and a control unit. The detection unit detects whether a recording medium loaded in the storage apparatus is a stand-alone-only recording medium that is used in a stand-alone mode. When the recording medium is the stand-alone-only recording medium, the control unit registers a physical volume of the stand-alone-only recording medium as a logical volume and automatically switches the operation mode of the control apparatus to the stand-alone mode.

14 Claims, 24 Drawing Sheets

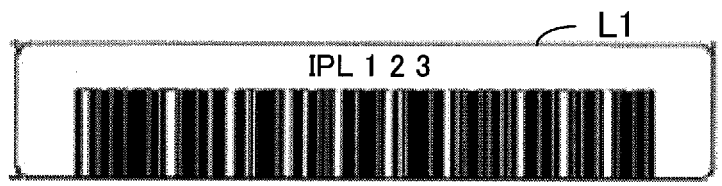
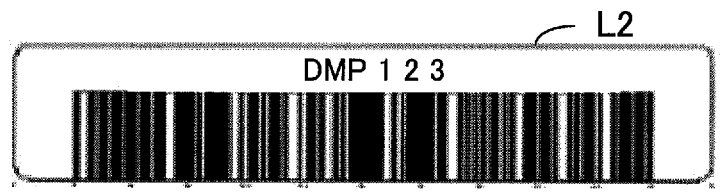
FIG. 4

22 PV LIST

| VOLUME NAME | STORAGE LOCATION | SIZE | STATUS | PHYSICAL UNIT NUMBER |
|---|---|---|---|---|
| XXX000 | YYYY | 400GB | Unmounted | |
| XXX001 | ZZZZ | 200GB | Mounted | 01 |
| IPL000 | — | 500GB | Mounted | 00 |
| | | | | |

FIG. 6

23 LV LIST

| VOLUME NAME | STORAGE LOCATION | SIZE | STATUS | LOGICAL UNIT NUMBER |
|---|---|---|---|---|
| AAA000 | XXXX | 100GB | Unmounted | |
| ABC001 | XXXX | 200GB | Mounted | 0001 |
| IPL000 | — | 500GB | Mounted | 0000 |
| DMP000 | — | 0 | Unmounted | |
| | | | | |

FIG. 7

24 LOGICAL UNIT NUMBER LIST

| LOGICAL UNIT NUMBER | ONL/OFL FLAG | HOST NAME | STATUS | NAME OF LV MOUNTED | STAND-ALONE MODE FLAG |
|---|---|---|---|---|---|
| 0000 | OFL | | | IPL000 | ON |
| 0001 | ONL | AAAA | | | OFF |
| 0002 | ONL | AAAA | Not Ready | | OFF |
| 0003 | ONL | BBBB | Ready | XXX000 | OFF |
| | | | | | |

FIG. 8

30 STAND-ALONE-PROCESSED VOLUME LIST

| VOLUME NAME | LV STORAGE LOCATION | PV STORAGE LOCATION | PROCESSING END DATE |
|---|---|---|---|
| IPL000 | XXX1 | YYY1 | Y1M1D1 |
| IPL001 | XXX2 | YYY2 | Y2M2D2 |
| DMP000 | XXX3 | YYY3 | Y3M3D3 |
| DMP001 | XXX4 | YYY4 | Y4M4D4 |
|  |  |  |  |

FIG. 19

STORAGE SYSTEM AND CONTROL APPARATUS

CROSS-REFERENCE TO RELATED APPLICATIONS

This application is based upon and claims the benefit of priority of the prior Japanese Patent Application No. 2014-032435, filed on Feb. 24, 2014, and the Japanese Patent Application No. 2014-179156, filed on Sep. 3, 2014, the entire contents of which are incorporated herein by reference.

FIELD

The embodiments discussed herein relate to a storage system and a control apparatus.

BACKGROUND

Real tape library apparatuses are storage apparatuses for reading and writing data on physical tapes. A typical tape library apparatus includes physical drives and physical tapes stored in slots. When data is read from or written in a physical tape, the tape library apparatus sets the physical tape from its slot on a physical drive. In addition, the real tape library apparatus includes a robot mechanism, which automatically exchanges physical tapes on a physical drive. Namely, the robot mechanism automatically mounts or unmounts a physical tape into or from a physical drive. Next, the real tape library apparatus performs data read and write processing through online processing on the basis of the operating system (OS) of a host.

Regarding such operations, a real tape library apparatus normally supports a stand-alone mode. In the stand-alone mode, an operator manually mounts a physical tape into a physical drive and uses a host console to control reading or writing of data offline, without involving the OS of the host. By switching the operation mode to this mode, the operator uses the real tape library apparatus in the same way as a stand-alone tape drive.

There is a conventional technique for receiving network services. According to this technique, each storage medium is provided with a service identifier that identifies a type of a network service. For example, when such a storage medium is mounted on an information processing terminal, the information processing terminal connects, via a communication link, to a host computer that corresponds to the service identifier of the storage medium. In this way, the operator of the information processing terminal receives a desired network service from the host computer.

In addition, there is a conventional technique about a product agent having information relating to a product. This technique uses a barcode printed on paper or a sheet as a medium transferred with a product.

See, for example, the following documents:
Japanese Laid-open Patent Publication No. 07-319810
Japanese Laid-open Patent Publication No. 2000-40109

While real tape library apparatuses support the stand-alone as described above, virtual tape apparatuses do not conventionally support the stand-alone mode. Thus, since the operator needs to perform complex stand-alone setup operations on such a conventional virtual tape apparatus, setting errors easily occur.

SUMMARY

According to an aspect of the embodiments to be described below, there is provided a storage system including: a storage apparatus that performs reading or writing data on recording media; and a control apparatus that includes a controller which registers, when detecting that a recording medium loaded into the storage apparatus is a stand-alone-only recording medium that is used in a stand-alone mode, a physical volume of the stand-alone-only recording medium as a logical volume and switches an operation mode to the stand-alone mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates stand-alone-only labels according to the first embodiment;

FIG. 6 illustrates an exemplary configuration of a physical volume (PV) list according to the first embodiment;

FIG. 7 illustrates an exemplary configuration of a logical volume (LV) list according to the first embodiment;

FIG. 8 illustrates an exemplary configuration of a logical unit number list according to the first embodiment;

FIG. 19 illustrates an exemplary configuration of a stand-alone-processed volume list according to the second embodiment;

DESCRIPTION OF EMBODIMENTS

Figure 1:
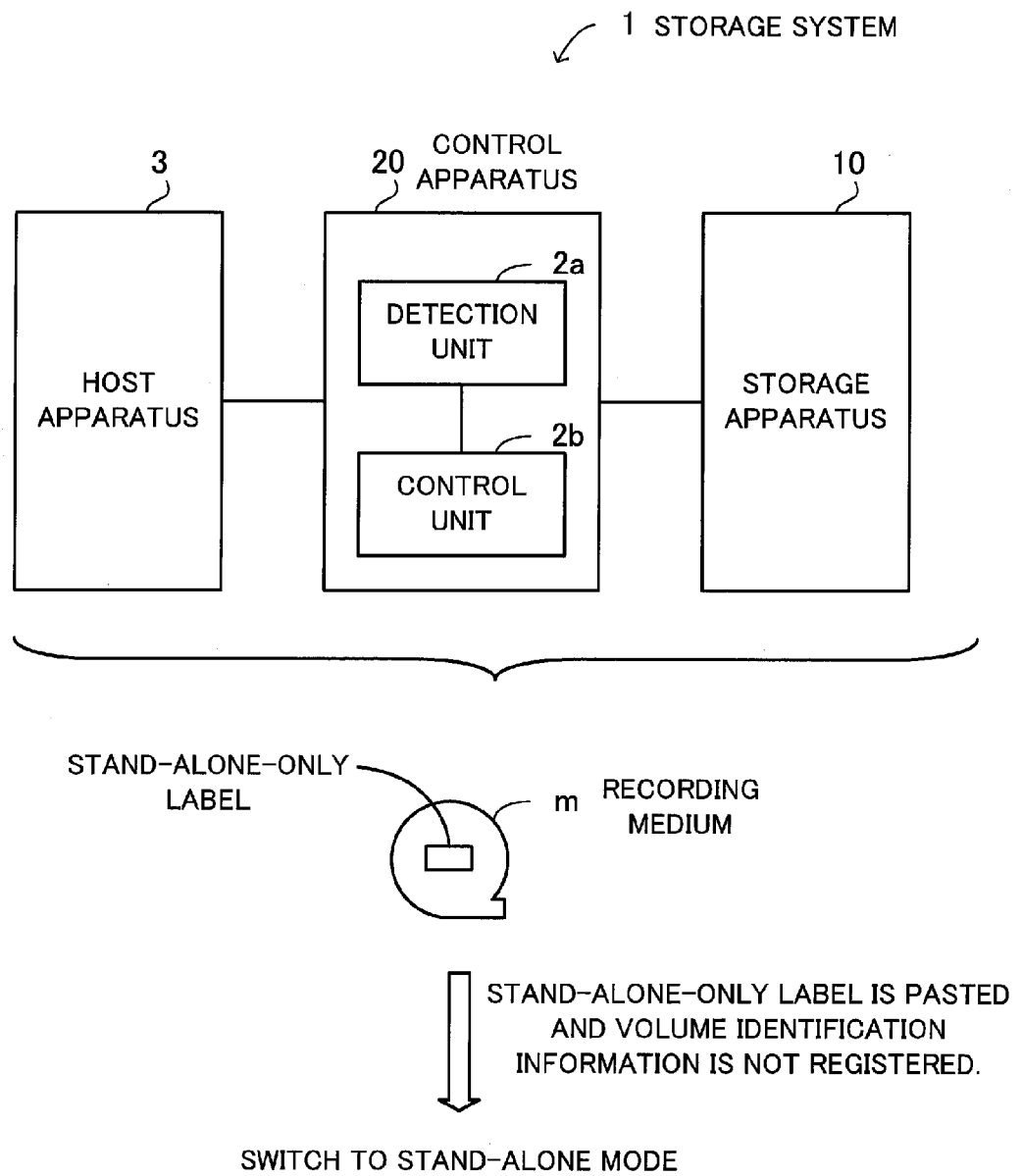
FIG. 1 illustrates an exemplary configuration of a storage system according to a first embodiment.

Several embodiments will be described below with reference to the accompanying drawings, wherein like reference characters refer to like elements throughout.

Hereinafter, a first embodiment will be described with reference to the drawings. FIG. 1 illustrates an exemplary configuration of a storage system according to the first embodiment. The illustrated storage system 1 includes a storage apparatus 10, a control apparatus 20, and a host apparatus 3.

The storage apparatus 10 includes portable recording media. Examples of such portable recording media include magnetic tapes, optical discs, and magneto-optical discs. In particular, magnetic tapes are used as recording media that realize back-end mass-storage areas in the storage system 1.

The control apparatus 20 includes a detection unit 2a and a control unit 2b. The detection unit 2a detects whether a recording medium loaded on the storage apparatus 10 is a stand-alone-only recording medium that needs to be used in a stand-alone operation mode in which the control apparatus 20 performs data processing by itself. The term "stand-alone" refers to an operation mode in which the control apparatus 20 performs data processing by itself offline without involving the operating system (OS) of the host apparatus 3.

More specifically, if a stand-alone-only label is pasted to a recording medium m and if the volume identification information on the stand-alone-only label is not registered, the detection unit 2a recognizes that this recording medium m is a stand-alone-only recording medium. If the recording medium m is a stand-alone-only recording medium, the control unit 2b registers the physical volume of the stand-alone-only recording medium as a logical volume and automatically switches the operation mode of the control apparatus 20 to the stand-alone mode.

Alternatively, instead of automatically switching the operation mode of the control apparatus 20 to the stand-alone mode, the control unit 2b may set the control apparatus 20 to a standby state so that the operation mode switches to the stand-alone mode in response to a predetermined event trigger (for example, in response to a confirmation operation by the operator).

In response to an input operation by the operator, the host apparatus 3 transmits an access request to the control apparatus 20, accesses a logical volume in the control apparatus 20, and performs data processing (reading/writing processing). Conventionally, to operate the control apparatus 20 in the stand-alone mode, the operator manually loads a physical volume and performs all the setup steps for the stand-alone operation.

In contrast, according to the storage system 1, when the detection unit 2a detects a stand-alone-only recording medium, the control unit 2b registers the physical volume of the recording medium as a logical volume and automatically switches the operation mode to the stand-alone mode. In this way, when operating the control apparatus 20 in the stand-alone mode, the operator does not need to perform all the complex setup steps. Thus, the stand-alone setup operations performed by the operator are simplified.

Figure 2:
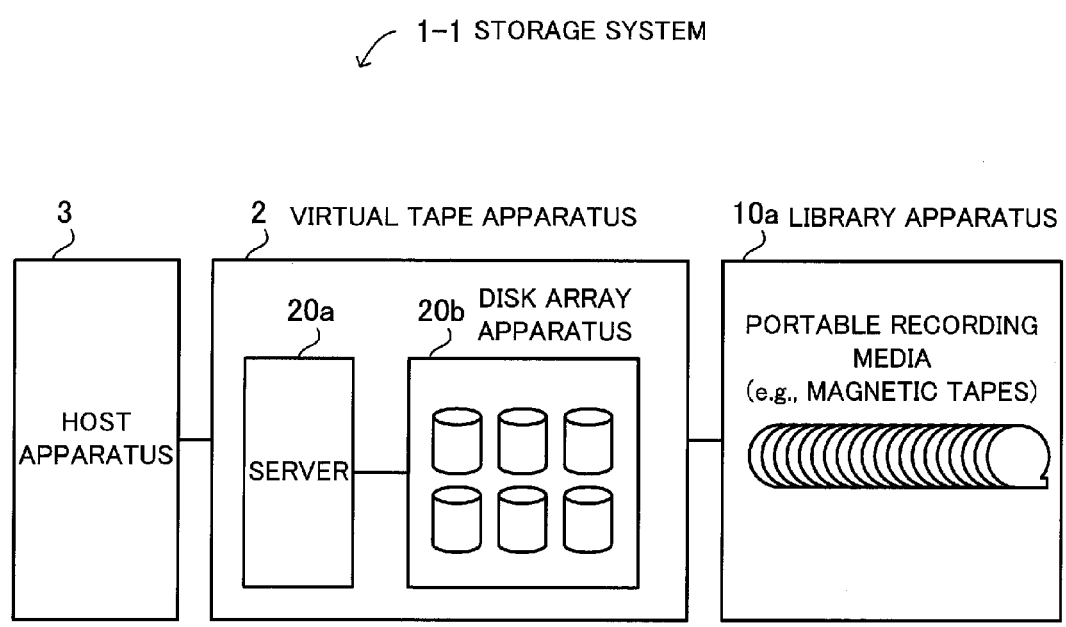
FIG. 2 illustrates a specific exemplary configuration of the storage system according to the first embodiment.

Next, a specific exemplary configuration of the storage system will be described. FIG. 2 illustrates a specific exemplary configuration of the storage system according to the first embodiment. The illustrated storage system 1-1 includes a library apparatus 10a, a virtual tape apparatus 2, and a host apparatus 3. While only one host apparatus 3 is illustrated, a plurality of host apparatuses 3 can be connected to the virtual tape apparatus 2.

The virtual tape apparatus 2 includes a server 20a and a disk array apparatus 20b including a plurality of hard disk drives (HDDs). The server 20a has functions corresponding to those of the control apparatus 20 illustrated in FIG. 1. In addition, the library apparatus 10a corresponds to the storage apparatus 10 in FIG. 1.

The storage system 1-1 realizes a virtual tape library system. In the virtual tape library system, the host apparatus 3 is allowed to virtually use the mass-storage areas realized by a large library apparatus 10a via the disk array apparatus 20b in the virtual tape apparatus 2. Hereinafter, the server 20a performs control so that the storage system 1-1 operates as a hierarchical virtual tape library system in which the magnetic tapes in the library apparatus 10a are used as a back-end library and the HDDs in the disk array apparatus 20b are used as cache devices. Other than HDDs, for example, solid state drives (SSDs) can be used as storage devices used as cache devices.

Figure 3:
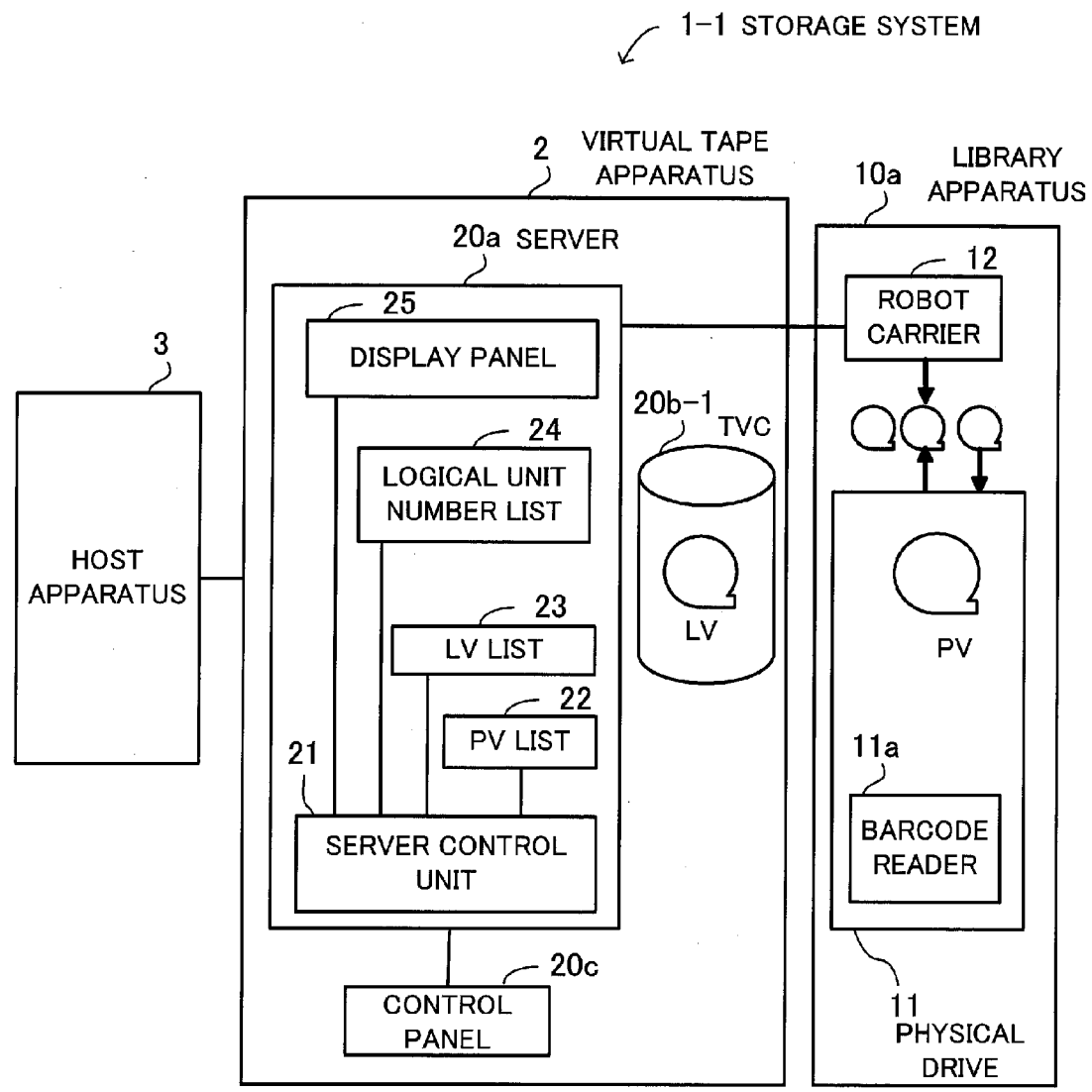
FIG. 3 illustrates an exemplary internal configuration of a library apparatus and of a server according to the first embodiment.

FIG. 3 illustrates an exemplary internal configuration of the library apparatus 10a and of the server 20a according to the first embodiment. Hereinafter, as needed, a physical volume and a logical volume will simply be referred to as a PV and an LV, respectively.

The library apparatus 10a includes a physical drive (a tape drive) 11 and a robot carrier 12. The physical drive 11 stores PVs, which are portable recording media (magnetic tapes, for example). In addition, the physical drive 11 includes a barcode reader 11a that reads information on the barcode labels pasted to the PVs. The robot carrier 12 automatically switches a PV between a slot (not illustrated) and the physical drive 11 and mounts/unmounts a PV into/from the physical drive 11.

The virtual tape apparatus 2 includes the server 20a and a tape volume cache (TVC) 20b-1 (in FIG. 3, only the TVC 20b-1 is illustrated as a part of the disk array apparatus 20b as a storage area). In addition, the virtual tape apparatus 2 includes a control panel 20c that is manually operated by the operator. The TVC 20b-1 is included in the disk array apparatus 20b in FIG. 2 and stores LV data. The control panel 20c provides the operator with a user interface for allowing the operator to manually perform operation settings of the server 20a, for example.

The server 20a includes a server control unit 21, a PV list 22, an LV list 23, a logical unit number list 24, and a display panel 25. The server control unit 21 comprehensively controls the server 20a and has the functions of the detection unit 2a and the control unit 2b in FIG. 1. The PV list 22 is a list in which information about PVs is registered. The LV list 23 is a list in which information about LVs is registered. The logical unit number list 24 is a list in which information about logical unit numbers is registered. Configuration of these lists will be described in detail below with reference to FIGS. 6 to 8. For example, the display panel 25 displays information about operations of the storage system 1-1 to the operator.

Next, dedicated labels (stand-alone-only labels) used for identifying the stand-alone will be described. FIG. 4 illustrates stand-alone-only labels according to the first embodiment. When using a PV in the stand-alone of the virtual tape apparatus 2, the operator makes sure that a stand-alone-only label is pasted to the PV. For example, a stand-alone-only label is a barcode label as illustrated in FIG. 4.

There are two kinds of stand-alone job operations, which are an initial program load (IPL) operation and a dump (DMP) operation. If a PV is used only for the IPL operation in the stand-alone mode, a stand-alone-only label for the IPL operation is prepared. If a PV is used only for the DMP operation, a stand-alone-only label for the DMP operation is prepared.

In the IPL operation, software of the host apparatus 3 is read from an LV. Namely, the LV uploads the software to the host apparatus 3. In contrast, in the DMP operation, data (memory core data) of the host apparatus 3 is written in an LV. Namely, the LV downloads the data from the host apparatus 3.

A stand-alone-only label L1 illustrated in FIG. 4 is a label on which "IPLnnn" (nnn is a serial number) is written as a read-only volume name. This stand-alone-only label L1 is pasted to a PV that is used only for the IPL operation.

In contrast, a stand-alone-only label L2 is a label on which "DMPnnn" (nnn is a serial number) is written as a write-only volume name. This stand-alone-only label L2 is pasted to a PV that is used only for the DMP operation.

Figure 5:
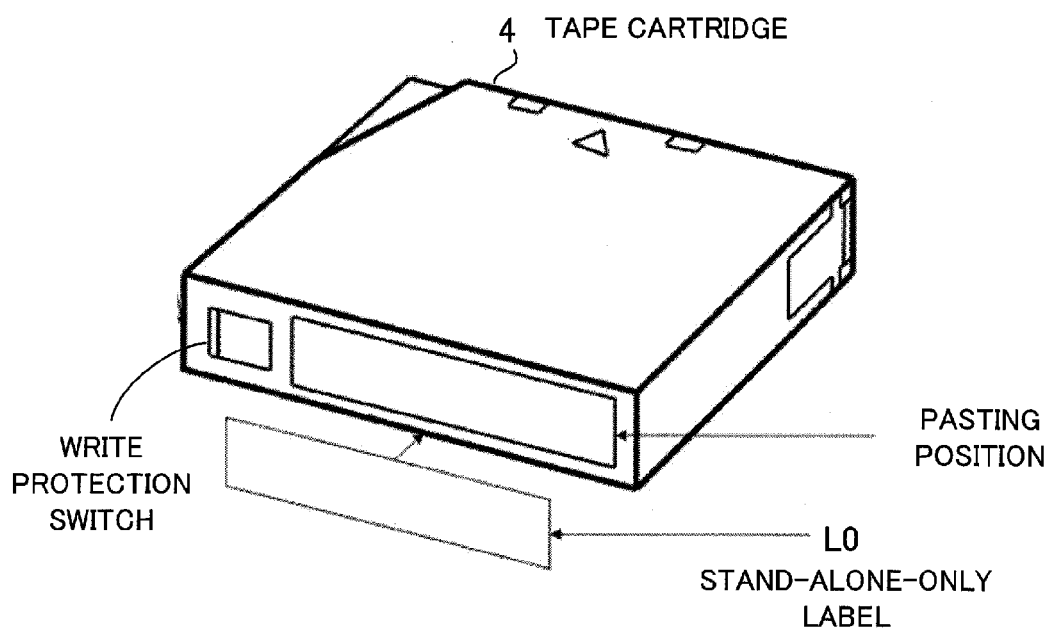
FIG. 5 illustrates the pasting position of a stand-alone-only label according to the first embodiment.

FIG. 5 illustrates the pasting position of a stand-alone-only label according to the first embodiment. Each PV is stored in a tape cartridge 4, and a stand-alone-only label L0 is pasted to each tape cartridge 4. For example, a stand-alone-only label L0 is pasted on the side where a write protection switch of a tape cartridge 4 is located.

Next, the PV list 22, the LV list 23, and the logical unit number list 24 will be described. The server 20a in the virtual tape apparatus 2 includes the PV list 22, the LV list 23, and the logical unit number list 24.

FIG. 6 illustrates an exemplary configuration of the PV list 22 according to the first embodiment. The PV list 22 includes columns for "volume name," "storage location," "size," "status," and "physical unit number." In an entry under "volume name," volume identification information of the corresponding PV is indicated. In an entry under "storage location," address information about where the corresponding PV is stored in the physical drive 11 is indicated. In an entry under "size," the current use amount of the corresponding PV is indicated. In an entry under "status," either "mount" or "unmount" is indicated. In an entry under "physical unit number," an identification number of the corresponding PV is indicated. The host apparatus 3 uses such a physical unit number to recognize a PV.

FIG. 7 illustrates an exemplary configuration of the LV list 23 according to the first embodiment. The LV list 23 includes columns for "volume name," "storage location," "size," "status," and "logical unit number." In an entry under "volume name," volume identification information of the corresponding LV is indicated. In an entry under "storage location," address information about where the corresponding LV is stored in the TVC 20b-1 is indicated. In an entry under "size," the current use amount of the corresponding LV is indicated. In an entry under "status," either "mount" or "unmount" is indicated. In an entry under "logical unit number," an identification number of the corresponding LV is indicated. The host apparatus 3 uses such a logical unit number to access an LV.

When data processing of the virtual tape apparatus 2 is performed via the OS of the host apparatus online, which will be referred to as a normal online operation, a volume name to be used is registered in advance in the PV list 22 and the LV list 23 before the normal online operation is started. In contrast, when the storage system 1-1 is operated in the stand-alone mode according to the first embodiment, a volume name to be used is not registered yet.

FIG. 8 illustrates an exemplary configuration of the logical unit number list 24 according to the first embodiment. The logical unit number list 24 includes columns for "logical unit number," "online/offline (ONL/OFL) flag," "host name," "status," "name of LV mounted," and "stand-alone mode flag." In an entry under "logical unit number," a logical unit number allocated to the corresponding LV is indicated. In an entry under "ONL/OFL flag," "ONL" is set when the host apparatus 3 is performing a normal online operation on the corresponding LV and "OFL" is set when the host apparatus 3 performs offline processing in the stand-alone mode.

In an entry under "host name," identification information of the host apparatus 3 performing a normal online operation on the corresponding LV is indicated. In an entry under "name of LV mounted," the volume name of the corresponding LV is indicated when data of the corresponding PV is registered as an LV and the LV is mounted to a logical unit number (=stand-alone-only PV volume name). The column "stand-alone mode flag" is a newly-provided attribute column. "ON" is set when a stand-alone operation is performed and "OFF" is set when a normal online operation is performed.

When a normal online operation is started, the host apparatus 3 transmits a VARY ONLINE command, and the logical unit number corresponding to the command is set online. In addition, when a command for mounting an LV is transmitted to the logical unit number set online, the status corresponding to the logical unit number is switched from "Not Ready" to "Ready", and the host apparatus 3 is notified of the change of the status (Not Ready to Ready).

When the status is switched to "Ready," the host apparatus 3 is allowed to access the LV and to start a normal online operation. After the logical unit number is used, the host apparatus 3 transmits a command for unmounting the LV and a VARY OFFLINE command. As a result, the storage system 1-1 is set offline. Along with such operation, the ONL/OFL flag and the host name on the logical unit number list 24 are updated. In the stand-alone mode, the host apparatus 3 does not transmit any of the VARY ONLINE, the VARY OFFLINE, and the commands for mounting and unmounting an LV.

Next, a stand-alone start operation, stand-alone job operations, and a stand-alone end operation in the stand-alone mode will be described in detail. First, the stand-alone start operation will be described.

Figure 9:
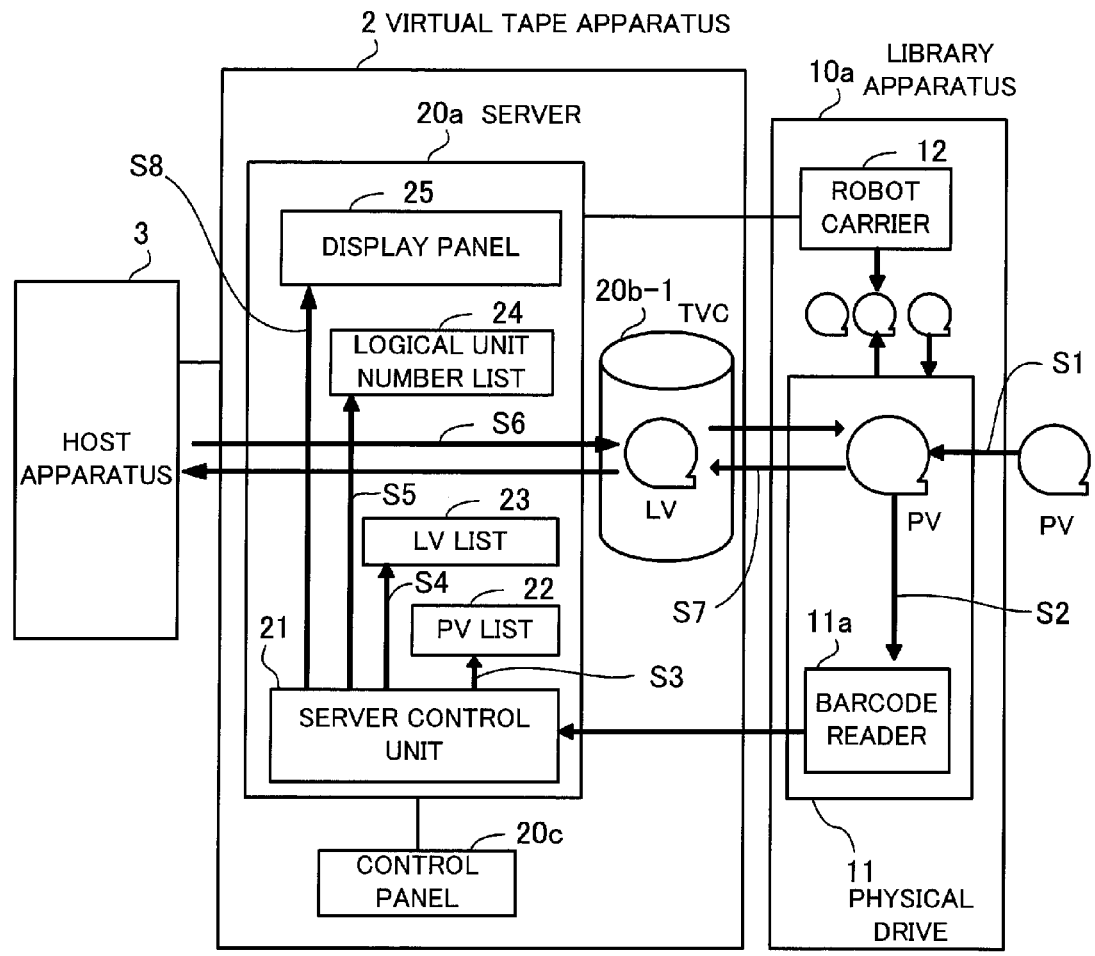
FIG. 9 illustrates a flow of a stand-alone start operation according to the first embodiment.

FIG. 9 is a flow of a stand-alone start operation according to the first embodiment.

[S1] The operator loads a PV, to which a stand-alone-only label is pasted, into the physical drive 11 (manual operation).

[S2] The barcode reader 11a reads a volume name from the barcode on the label pasted to the PV.

[S3] If the label is a stand-alone-only label and the volume name is not registered in the PV list 22, the server control unit 21 registers the PV in the PV list 22.

[S4] If the label is a stand-alone-only label and the volume name is not registered in the LV list 23, the server control unit 21 registers the LV in the LV list 23 by using the volume name of the PV as the volume name of the LV.

[S5] The server control unit 21 allocates a logical unit number that is not used in the logical unit number list 24 and sets the stand-alone mode flag corresponding to the allocated logical unit number to ON on the logical unit number list 24.

[S6] The host apparatus 3 mounts the LV to the allocated logical unit number.

[S7] If the volume name indicates IPLnnn, the server control unit 21 copies the data of the PV to the LV.

[S8] The server control unit 21 causes the display panel 25 to display information representing the end of preparation of the stand-alone mode.

Figure 10:
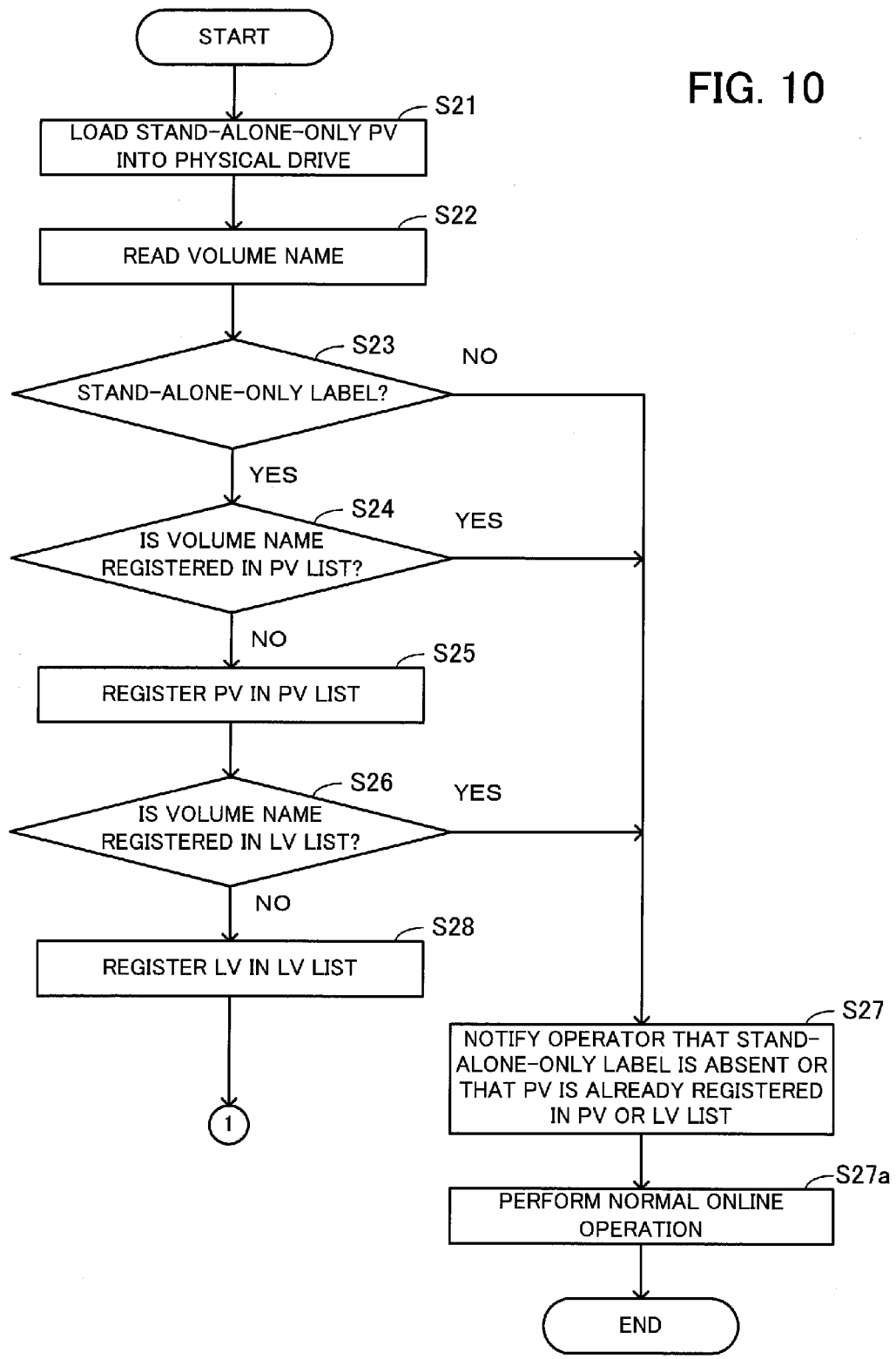
FIGS. 10 and 11 are flowcharts illustrating the stand-alone start operation according to the first embodiment.
Figure 11:
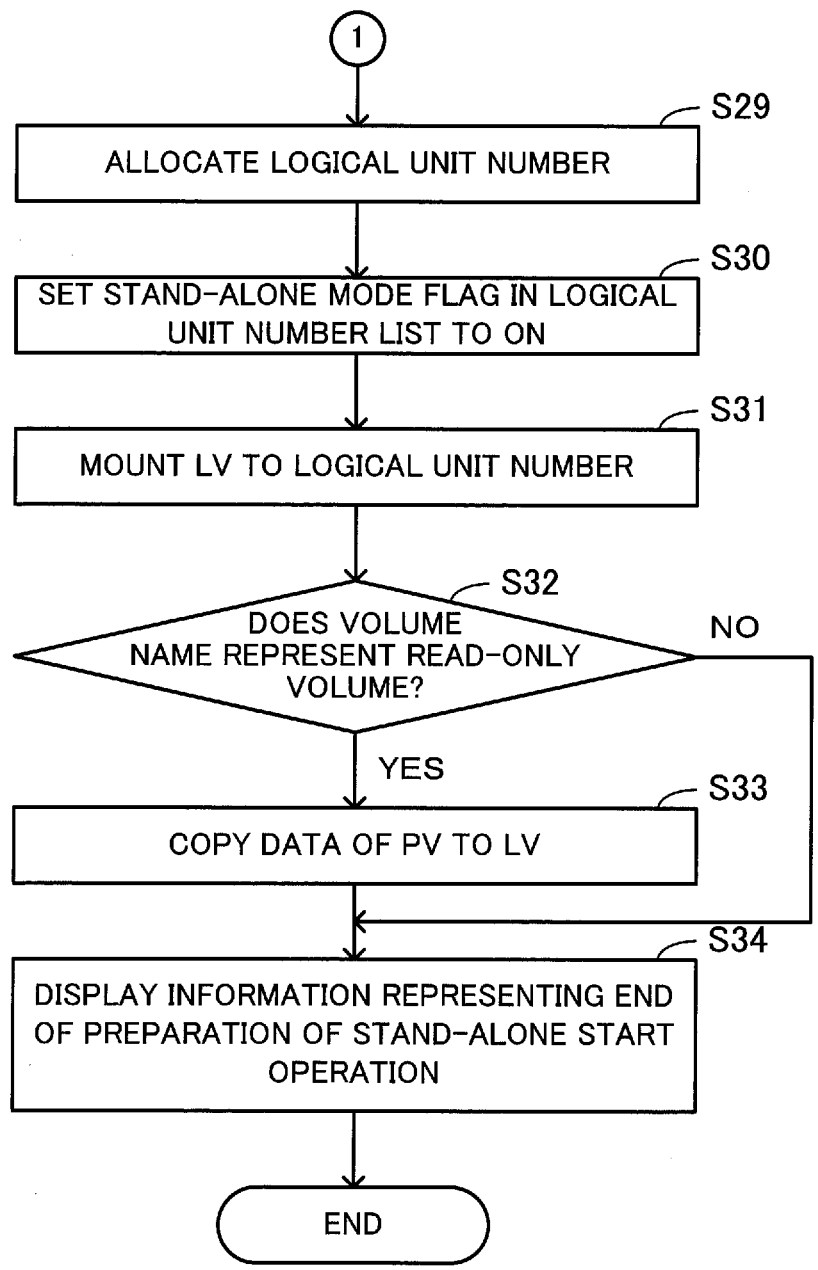

FIGS. 10 and 11 are flowcharts illustrating the stand-alone start operation according to the first embodiment.

[S21] The operator loads a stand-alone-only PV, to which a stand-alone-only label is pasted, into the physical drive 11 (manual operation).

[S22] The barcode reader 11a reads a volume name from the barcode on the label pasted to the PV.

[S23] The server control unit 21 determines whether the label is a stand-alone-only label. If the label is a stand-alone-only label, the server control unit 21 performs step S24. Otherwise, the server control unit 21 performs step S27.

[S24] The server control unit 21 determines whether the read volume name is registered in the PV list 22. If the read volume name is not registered in the PV list 22, the server control unit 21 performs step S25. Otherwise, the server control unit 21 performs step S27. The PV list 22 includes information about registered PVs and the information includes the volume names of the registered PVs, the names corresponding to volume identification information of the PVs. Thus, the PV list 22 corresponds to registration information that indicates whether the volume identification information is registered.

[S25] The server control unit 21 registers the PV loaded on the physical drive 11 in the PV list 22.

[S26] The server control unit 21 determines whether the read volume name is registered in the LV list 23. If the read volume name is not registered in the LV list 23, the server control unit 21 performs step S28. Otherwise, the server control unit 21 performs step S27.

[S27] The server control unit 21 causes the display panel 25 to display PV information (volume name, etc.) read by the barcode reader 11a, to notify the operator that a stand-alone-only label is not pasted to the PV or that the PV is already registered in the PV list 22 or the LV list 23.

[S27a] The virtual tape apparatus 2 and the host apparatus 3 perform a normal online operation (the host apparatus 3 transmits a VARY ONLINE command and performs online LV data processing).

[S28] The server control unit 21 registers the LV in the LV list 23 by using the volume name of the PV as the volume name of the LV. For example, if the volume name of the PV is IPL000, the volume name of the LV is set to IPL000 in the LV list 23 (see FIG. 7).

[S29] The server control unit 21 allocates a logical unit number that is not used in the logical unit number list 24 to the LV registered in the LV list 23 in step S28.

[S30] The server control unit 21 sets the stand-alone mode flag corresponding to the LV registered in the logical unit number list 24 to ON.

[S31] The server control unit 21 mounts the LV to the allocated logical unit number. At this point, for example, if the volume name of the LV is IPL000 and the allocated logical unit number is 0000, the logical unit number is set to 0000, the ONL/OFL flag is set to OFL, the name of the LV mounted is set to IPL000, and the stand-alone mode flag is set to ON in the logical unit number list 24 (see FIG. 8).

[S32] The server control unit 21 determines whether the volume name of the stand-alone-only label pasted to the PV is IPLnnn (namely, whether the volume name represents a read-only volume). If the volume name is IPLnnn, the server control unit 21 performs step S33. Otherwise, the server control unit 21 performs step S34.

[S33] The server control unit 21 copies the data of the PV to the LV.

[S34] The server control unit 21 causes the display panel 25 to display information representing the end of preparation of the stand-alone start operation.

As described above, when the stand-alone is started, the operator loads a PV, to which a stand-alone-only label is pasted as illustrated in FIG. 4, into the physical drive 11. Next, even if the server control unit detects that the PV is set, if the label is not a stand-alone-only label, the server control unit 21 performs a normal online operation without switching the operation mode to the stand-alone mode. In addition, even if the label is a stand-alone-only label, if the volume name on the label is already registered, the server control unit 21 performs a normal online operation without switching the operation mode to the stand-alone mode.

In contrast, if the label is a stand-alone-only label and the volume name of the label is not registered, the server control unit 21 registers the LV in the LV list 23 by using the volume name of the PV as the volume name of the LV, allocates an unused logical unit number to the LV, and sets the allocated logical unit number to the stand-alone mode (sets the corresponding stand-alone mode flag in the logical unit number list 24 to ON). Next, the LV is mounted to the allocated logical unit number.

Controlled in this way, the virtual tape apparatus 2 appropriately recognizes a stand-alone-only recording medium and automatically switches to the stand-alone mode. In this way, since the operator only needs to load a PV, to which a stand-alone-only label is pasted, to set the stand-alone mode, the setup operations are simplified.

In contrast, when a conventional virtual tape apparatus is set to the stand-alone mode, since complex setup operations are needed, setting errors easily occur, whereby a failure could occur. However, according to the first embodiment, since the virtual tape apparatus 2 switches to the stand-alone mode by a simple setting, such setting errors are eliminated. Thus, the possibility of occurrence of a failure is reduced.

Next, the stand-alone job operations will be described. There are mainly two kinds of stand-alone job operations, which are the IPL operation and the DMP operation. In addition, a guard control operation is performed to guard the virtual tape apparatus 2 from being accessed by other hosts while one host is performing the IPL operation or the DMP operation.

Figure 12:
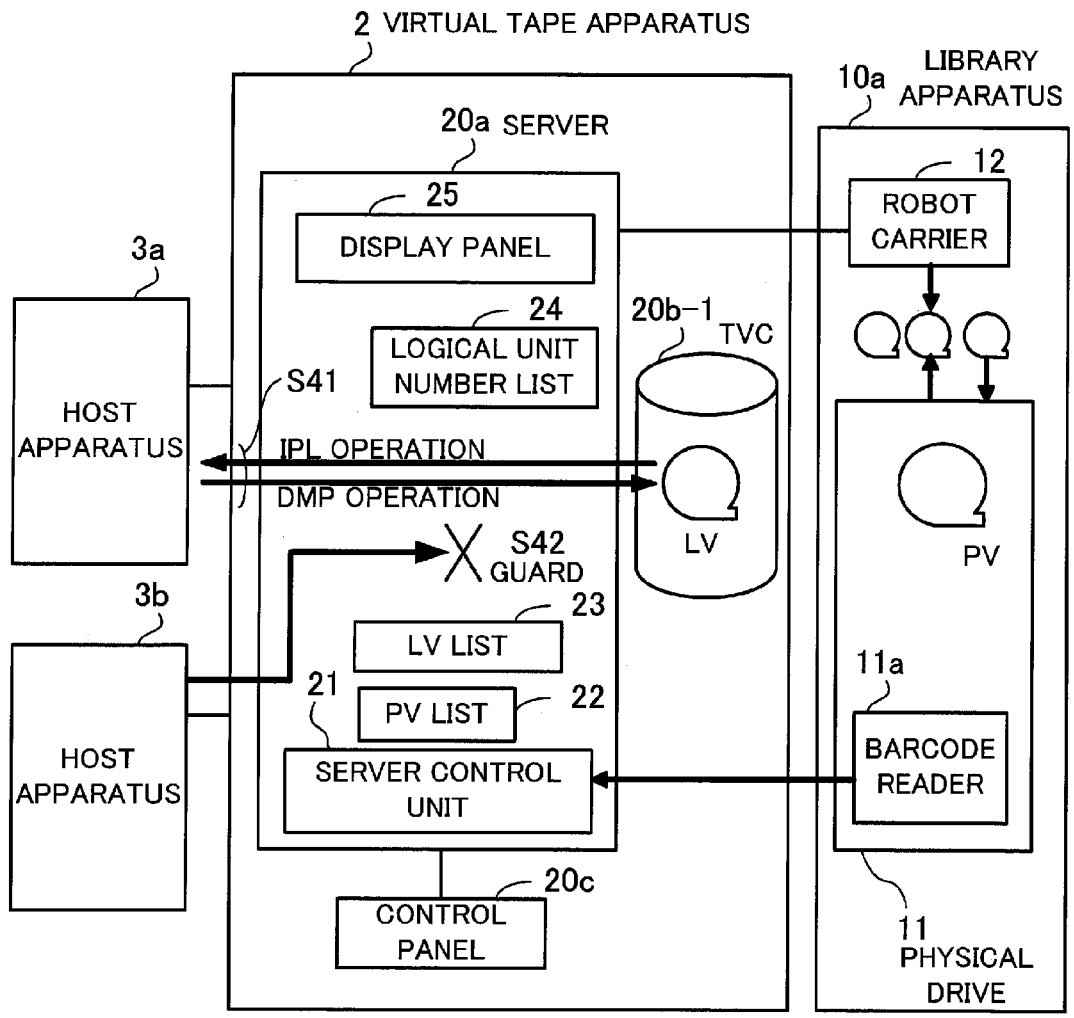
FIG. 12 illustrates a stand-alone job operation and a guard control operation according to the first embodiment.

FIG. 12 illustrates a stand-alone job operations and the guard control operation according to the first embodiment.

[S41] The operator starts the IPL or the DMP operation by using a console of a host apparatus 3a.

Since the IPL operation is an operation in which software of the host is uploaded from an LV, the host apparatus 3a continuously transmits read commands to the virtual tape apparatus 2. In contrast, since the DMP operation is an operation in which memory core data of the host apparatus 3a is downloaded to an LV, the host apparatus 3a continuously transmits write commands to the virtual tape apparatus 2.

[S42] During the IPL operation or the DMP operation, the server control unit 21 monitors the stand-alone mode flags in the logical unit number list 24. If there are logical unit numbers whose stand-alone mode flags are ON, the server control unit 21 guards the corresponding LVs from being accessed by other hosts (for example, from a host apparatus 3b).

More specifically, after the stand-alone mode flag of an LV is set to ON, if another host transmits a VARY ONLINE command to the LV, the virtual tape apparatus 2 notifies this host of an error message indicating that the LV is currently in use. If a host transmits a write command to an LV corresponding to a logical unit number to which a read-only label IPLnnn is mounted, the server control unit 21 also notifies this host of an error message.

Figure 13:
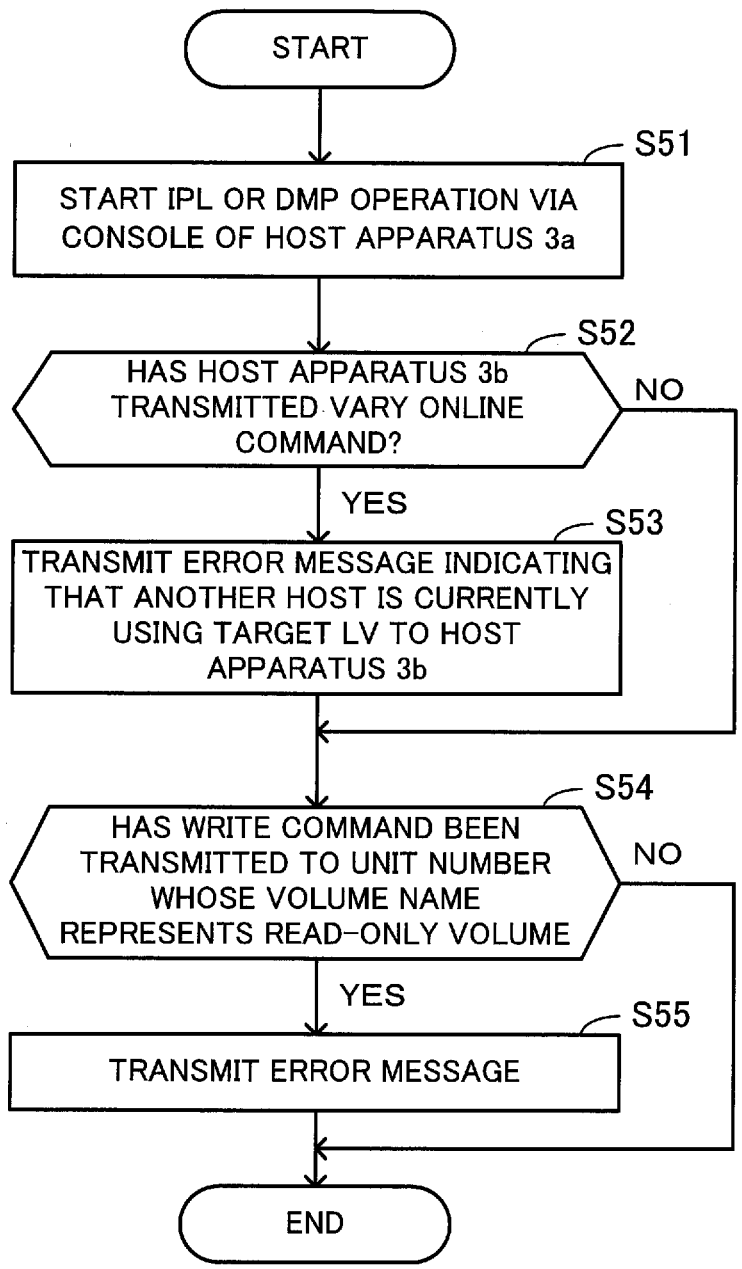
FIG. 13 is a flowchart illustrating the stand-alone job operation and the guard control operation according to the first embodiment.

FIG. 13 is a flowchart illustrating a stand-alone job operation and the guard control operation according to the first embodiment.

[S51] The operator starts the IPL or DMP operation by using the console of the host apparatus 3a.

[S52] The server control unit 21 determines whether the host apparatus 3b has transmitted a VARY ONLINE command. If so, the server control unit 21 performs step S53. Otherwise, the server control unit 21 performs step S54.

[S53] The server control unit 21 transmits an error message indicating that another host is currently using the requested LV to the host apparatus 3b.

[S54] The server control unit 21 determines whether the host apparatus 3a has transmitted a write command to a unit number whose volume name is IPLnnn. If so, the server control unit 21 performs step S55. Otherwise, the server control unit 21 ends the processing.

[S55] The server control unit 21 transmits an error message to the host apparatus 3a. As described above, when performing a stand-alone job operation, the virtual tape apparatus 2 performs the guard control operation so that the LVs corresponding to the logical unit numbers whose stand-alone mode flags are ON in the logical unit number list 24 are not accessed by other hosts. In this way, destruction of data is prevented.

Figure 14:
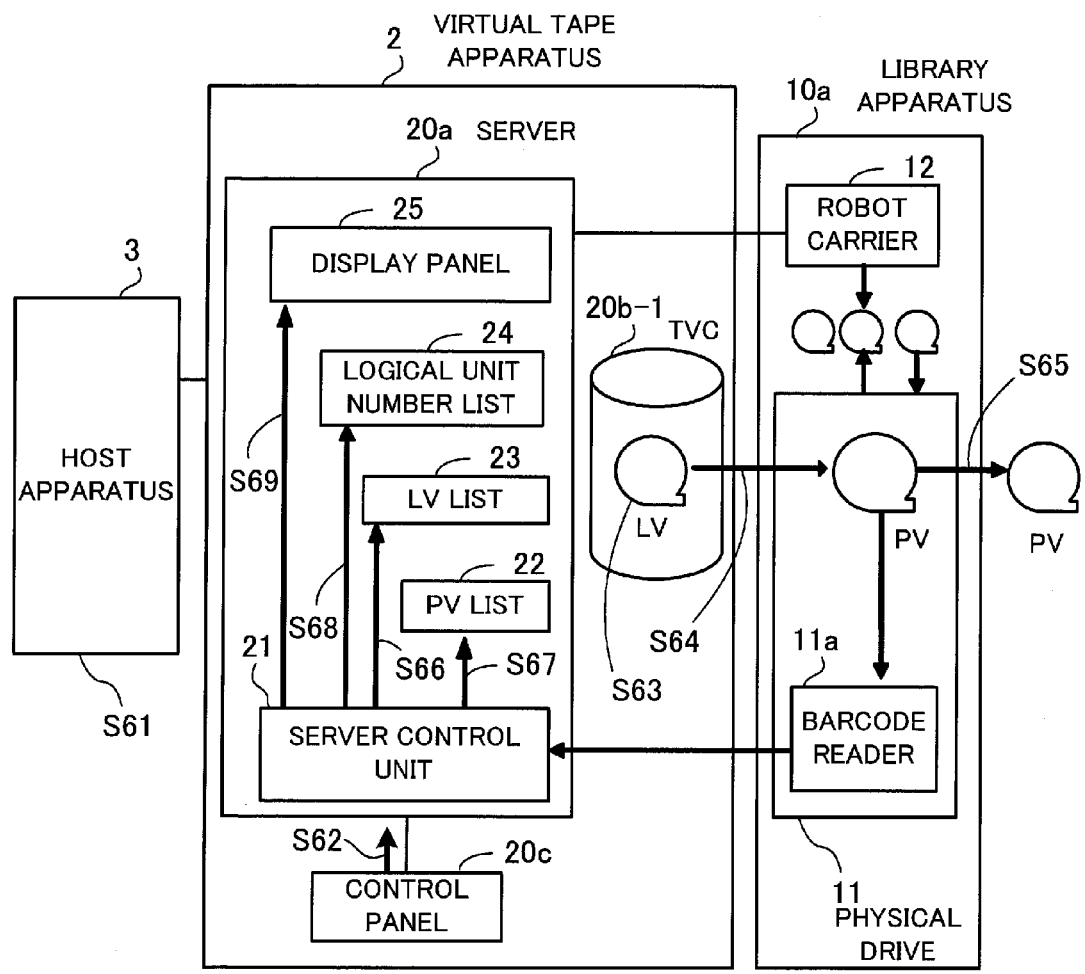
FIG. 14 illustrates a flow of a stand-alone end operation according to the first embodiment.

Next, a stand-alone end operation will be described. FIG. 14 illustrates a flow of a stand-alone end operation according to the first embodiment.

[S61] A console of the host apparatus 3 recognizes the end of a stand-alone operation.

[S62] In response to an operation by the operator, the control panel 20c of the virtual tape apparatus 2 specifies a logical unit number and instructs the end of the stand-alone mode operation.

[S63] The server control unit 21 unmounts the LV corresponding to the specified logical unit number.

[S64] If the volume name of the LV is DMPnnn, the server control unit 21 copies the data of the LV to the PV.

[S65] The server control unit 21 unloads the PV from the physical drive 11.

[S66] The server control unit 21 deletes the registered information about the LV from the LV list 23.

[S67] The server control unit 21 deletes the registered information about the PV from the PV list 22.

[S68] The server control unit 21 sets the stand-alone mode flag in the logical unit number list 24 to OFF.

[S69] The server control unit 21 causes the display panel 25 to display information representing the end of the stand-alone mode.

Figure 15:
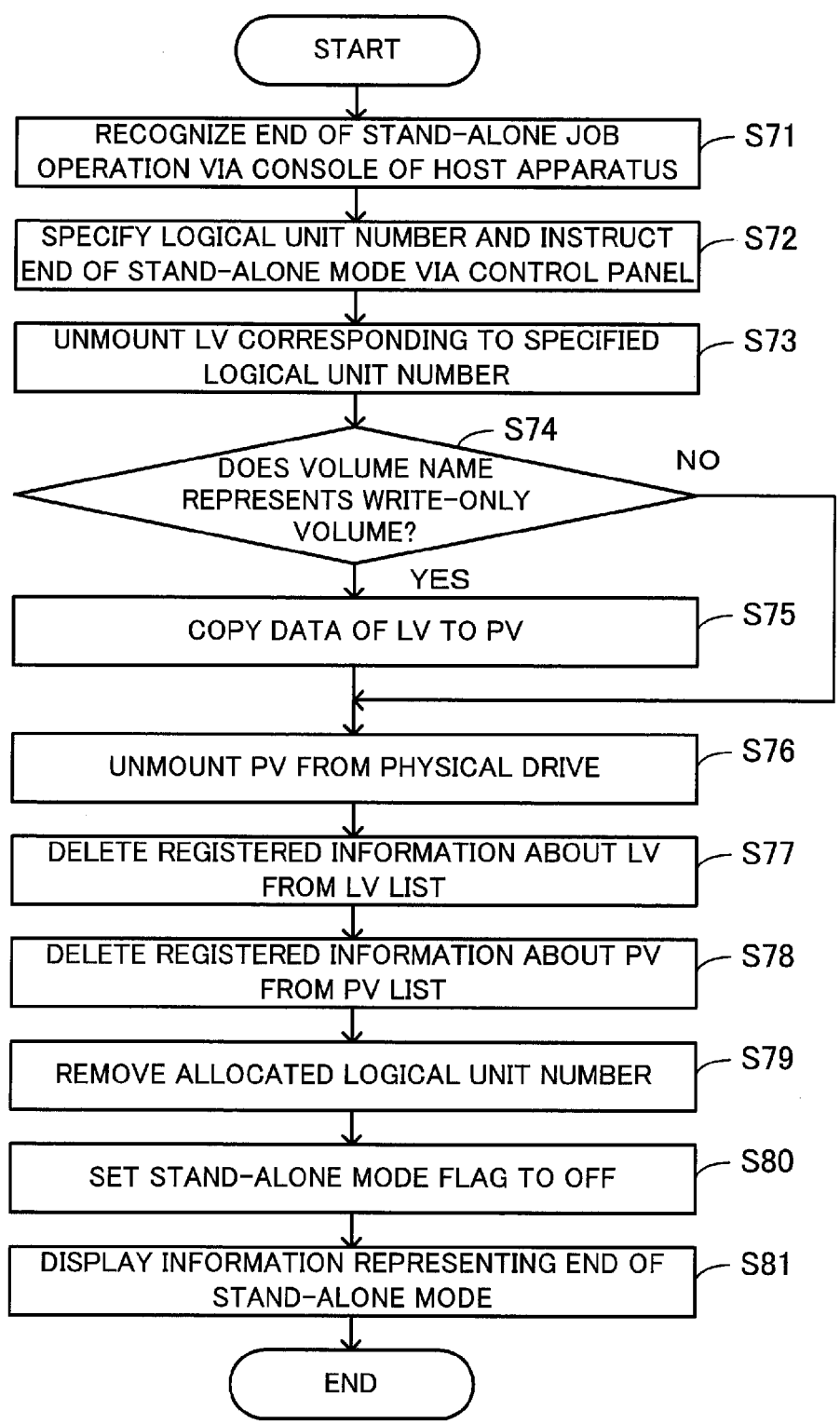
FIG. 15 is a flowchart illustrating the stand-alone end operation according to the first embodiment.

FIG. 15 is a flowchart illustrating the stand-alone end operation according to the first embodiment.

[S71] The console of the host apparatus 3 recognizes the end of a stand-alone job operation.

[S72] In response to an operation by the operator, the control panel 20c of the virtual tape apparatus 2 specifies a logical unit number and instructs the end of the stand-alone mode operation.

[S73] The server control unit 21 unmounts the LV corresponding to the specified logical unit number.

[S74] The server control unit 21 determines whether the volume name represents a write-only volume (DMPnnn). If so, the server control unit 21 performs step S75. Otherwise, the server control unit 21 performs step S76.

[S75] The server control unit 21 copies the data of the LV to the PV.

[S76] The server control unit 21 unmounts the PV from the physical drive 11.

[S77] The server control unit 21 deletes the registered information about the LV from the LV list 23.

[S78] The server control unit 21 deletes the registered information about the PV from the PV list 22.

[S79] The server control unit 21 removes the allocated logical unit number from the logical unit number list 24.

[S80] The server control unit 21 sets the stand-alone mode flag in the logical unit number list 24 to OFF.

[S81] The server control unit 21 causes the display panel 25 to display information representing the end of the stand-alone mode.

As described above, when a stand-alone operation is ended, the server control unit 21 in the virtual tape apparatus 2 unmounts the corresponding LV therein. If the volume name represents a write-only label, the server control unit 21 copies the data of the LV to the PV. After unmounting the PV, the server control unit 21 deletes the corresponding registered information from the LV list 23 and the PV list 22 and sets the stand-alone mode flag in the logical unit number list 24 to OFF.

In the storage system 1-1 controlled in this way, the operator only needs to specify a logical unit number for which the operator wishes to end the stand-alone mode. As a result, since the stand-alone mode is automatically ended, processing for ending the stand-alone mode is easily performed and switching to the normal online operation is promptly performed.

Figure 16:
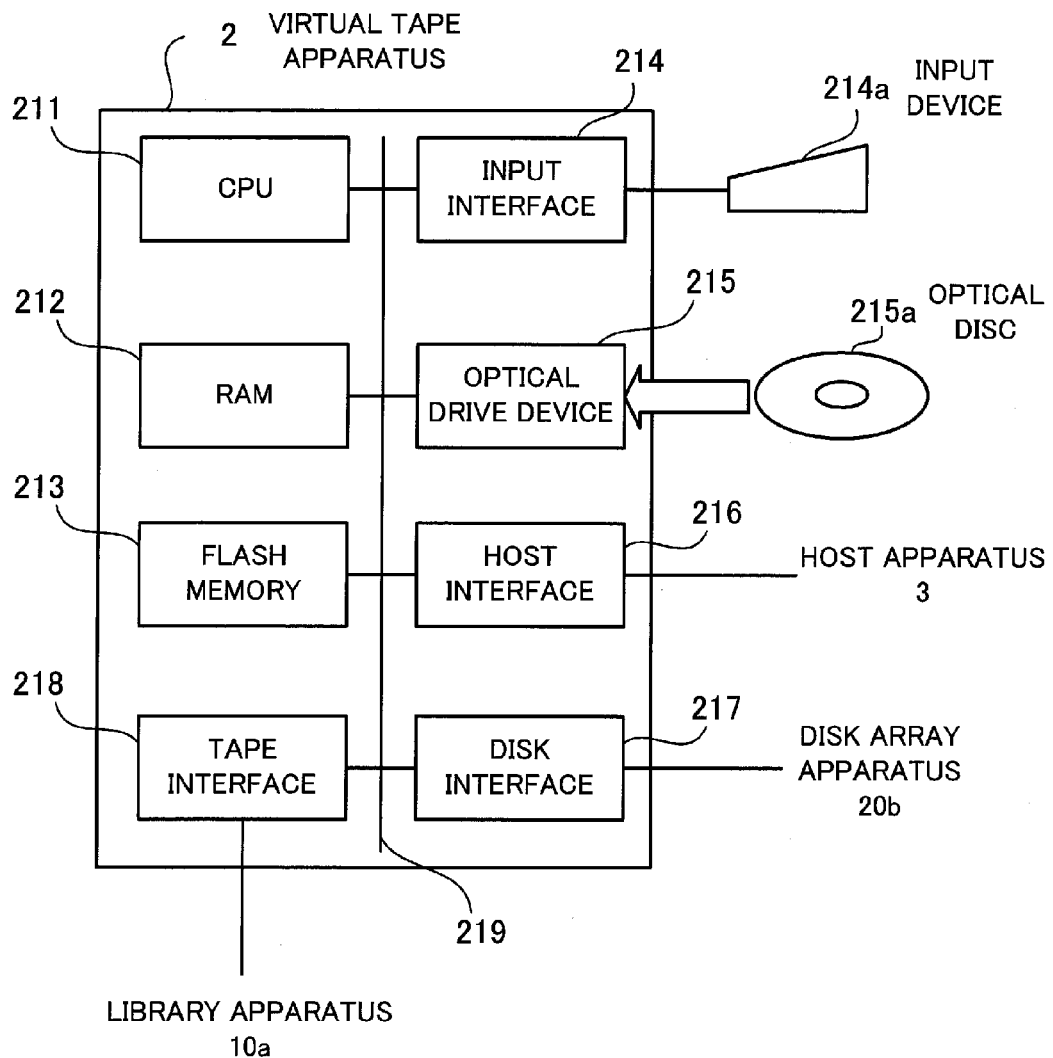
FIG. 16 illustrates an exemplary hardware configuration of a virtual tape apparatus according to the first embodiment.

Next, an exemplary hardware configuration of the virtual tape apparatus 2 will be described. FIG. 16 illustrates an exemplary hardware configuration of the virtual tape apparatus 2 according to the first embodiment.

The virtual tape apparatus 2 can be realized by a computer as illustrated in FIG. 16.

The virtual tape apparatus 2 is comprehensively controlled by a central processing unit (CPU) 211. The CPU 211 is connected to a random access memory (RAM) 212 and a plurality of peripheral devices via a bus 219. The RAM 212 is used as a main storage device of the virtual tape apparatus 2. At least a part of the firmware program executed by the CPU 211 is temporarily stored in the RAM 212. In addition, various kinds of data needed for processing by the CPU 211 is stored in the RAM 212.

For example, a flash memory 213, an input interface 214, an optical drive device 215, a host interface 216, a disk interface 217, and a tape interface 218 are connected to the bus 219 as the peripheral devices.

The flash memory 213 is used as a secondary storage device of the virtual tape apparatus 2. A firmware program and various kinds of data are stored in the flash memory 213. A different kind of nonvolatile storage device such as an HDD may be used as the secondary storage device.

For example, an input device 214a (corresponding to the control panel 20c) including various kinds of operation keys is connectable to the input interface 214. The input interface 214 transmits a signal from the input device 214a to the CPU 211 via the bus 219. The input device 214a may be mounted on the virtual tape apparatus 2.

For example, the optical drive device 215 uses laser light to read data recorded on an optical disc 215a. The optical disc 215a is a portable recording medium in which data readable by optical reflection is recorded. Examples of the optical disc 215a include a digital versatile disc (DVD), a DVD-RAM, a compact disc read-only memory (CD-ROM), and a compact disc recordable (CD-R)/rewritable (RW).

The host interface 216 is a communication interface that exchanges data with the host apparatus 3. The disk interface 217 is a communication interface that exchanges data with the disk array apparatus 20b. The tape interface 218 is a communication interface that exchanges data with the library apparatus 10a.

The processing functions according to the first embodiment can be realized by the hardware configuration as described above. To cause a computer to realize the processing functions according to the first embodiment, the computer is provided with a program in which the processing contents of the functions of the virtual tape apparatus 2 are written. By causing the computer to execute the program, the above processing functions are realized on the computer. The program in which the processing contents are written can be recorded in a computer-readable recording medium.

Examples of the computer-readable recording medium include a magnetic storage device, an optical disc, a magneto-optical recording medium, and a semiconductor memory. Examples of the magnetic storage device include an HDD, a flexible disk (FD), and a magnetic tape. Examples of the optical disc include a DVD, a DVD-RAM, and a CD-ROM/RW. Examples of the magneto-optical recording medium include a magneto optical disc (MO). The recording medium in which the program is recorded does not include temporary propagation signals.

One way to distribute the program is to sell portable recording media such as DVDs or CD-ROMs in which the program is recorded. In addition, the program can be stored in a storage device of a server computer and forwarded to other computers from the server computer via a network. For example, a computer that executes the program stores the program recorded in a portable recording medium or forwarded from the server computer in a storage device of the computer. Next, the computer directly reads the program from the storage device and executes processing in accordance with the program. The computer can directly read the program from the portable recording medium and perform processing in accordance with the program. In addition, each time the computer receives a program from the server computer, the computer can execute processing in accordance with the program. At least a part of the above processing functions may be realized by an electric circuit such as a digital signal processor (DSP), an application specific integrated circuit (ASIC), or a programmable logic device (PLD).

As described above, according to the first embodiment, by using the above stand-alone-only labels, volumes used in stand-alone jobs are distinguished from volumes used in normal jobs. Thus, operational errors are reduced.

In addition, when an unregistered PV, to which a stand-alone-only label is pasted, is mounted, the virtual tape apparatus 2 automatically recognizes the start of a stand-alone operation mode and performs a predetermined sequence operation. In addition, the virtual tape apparatus 2 prevents other hosts from using logical unit numbers being used in stand-alone jobs.

In this way, since logical unit numbers used in stand-alone jobs and logical unit numbers used in normal online jobs are distinguished, destruction of data caused by double allocation or the like is prevented.

While an embodiment has thus been described as an example, the configuration of each element illustrated in the embodiment may be replaced by another configuration having an equivalent function. In addition, other components or steps may be added.

Second Embodiment

Next, a second embodiment will be described with reference to the drawings. When the storage system 1 according to the first embodiment switches to the stand-alone mode, the operator needs to insert a stand-alone-only recording medium into the storage apparatus 10. In addition, when the storage system 1 ends the stand-alone mode, the operator needs to eject the stand-alone-only recording medium from the storage apparatus 10. To insert/eject a stand-alone-only recording medium into/from the storage apparatus 10, the operator needs to go to where the storage apparatus 10 is located. However, in reality, it is often the case that the operator uses the same stand-alone-only recording medium. Namely, it is troublesome for the operator to insert/eject the stand-alone-only recording medium each time the operator uses it. To address this, a storage system, a control apparatus, and a program according to the second embodiment further simplify the setup operations. In an aspect of the second embodiment, the setup operations can be further simplified.

Figure 17:
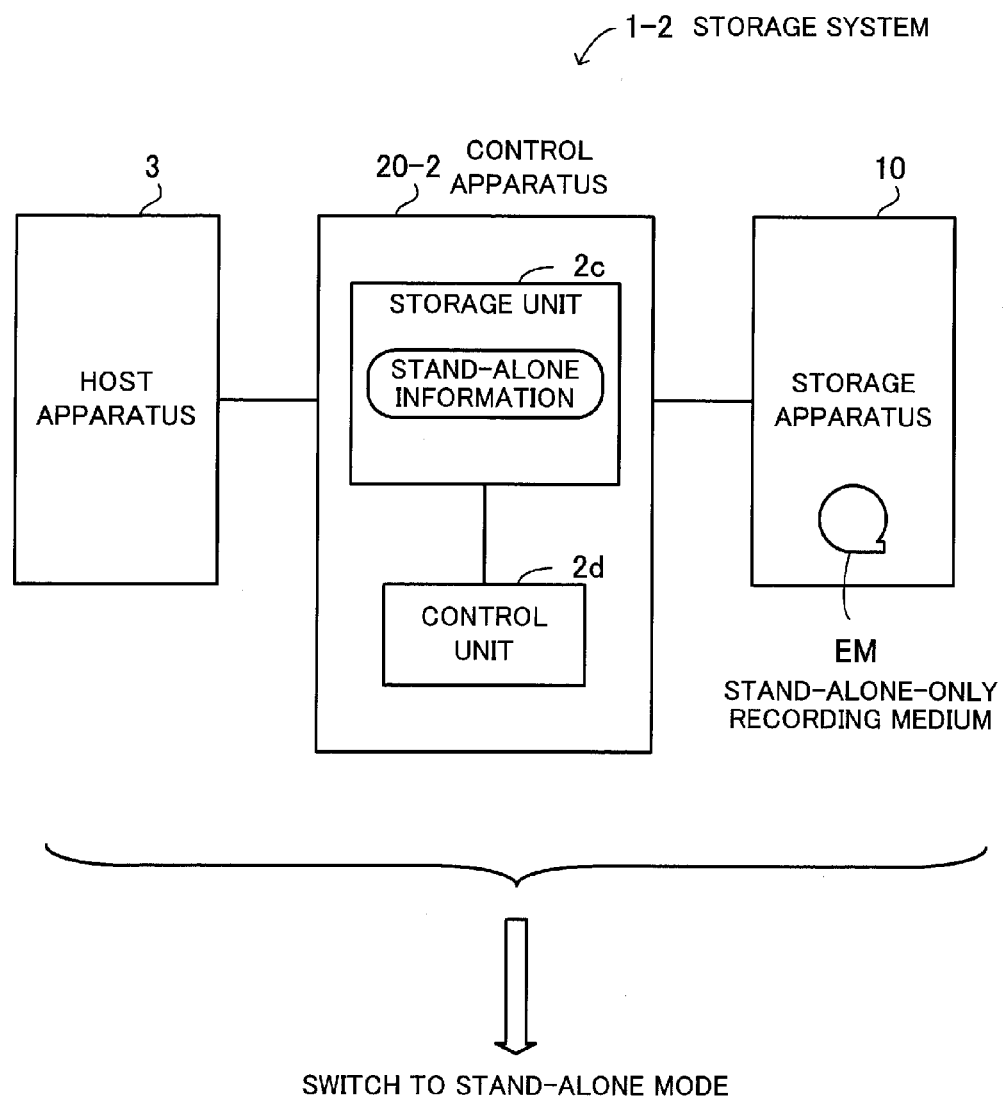
FIG. 17 illustrates an exemplary configuration of a storage system according to a second embodiment.

FIG. 17 illustrates an exemplary configuration of a storage system according to the second embodiment. The illustrated storage system 1-2 includes a storage apparatus 10, a control apparatus 20-2, and a host apparatus 3. The storage apparatus 10 includes portable recording media and performs reading/writing on the recording media. Examples of such recording media include magnetic tapes, optical discs, and magneto-optical discs. In particular, magnetic tapes are used as recording media that realize back-end mass-storage areas in the storage system 1-2. In addition, while the operator can insert and eject stand-alone-only recording media EM into and from the storage apparatus 10, the storage apparatus 10 can store these inserted stand-alone-only recording media EM.

The control apparatus 20-2 includes a storage unit 2c and a control unit 2d. The storage unit 2c stores stand-alone information. The stand-alone information is information in which volume names and PVs and LVs of detected stand-alone-only recording media EM are associated with each other.

The control unit 2d receives a stand-alone operation instruction in which a volume name is specified. The control unit 2d receives the stand-alone operation instruction via the host apparatus 3 when the operator specifies a stand-alone operation. When receiving the stand-alone operation instruction, the control unit 2d refers to the stand-alone information. The control unit 2d determines whether the volume specified in the stand-alone operation instruction matches a volume included in the stand-alone information (a first condition). In addition, the control unit 2d determines whether the stand-alone-only recording medium EM that needs to be used in the stand-alone operation mode is associated with a volume specified in the stand-alone operation instruction and is stored in the storage apparatus 10 (a second condition). If both the first and second conditions are met, the control unit 2d registers the PV corresponding to a volume specified in the stand-alone operation instruction as an LV and switches the operation mode to the stand-alone mode.

When the operator performs an input operation, the host apparatus 3 transmits an access request to the control apparatus 20-2, accesses the corresponding LV in the control apparatus 20-2, and performs data processing (reading/writing processing). In addition, when the operator performs the input operation, the host apparatus transmits a stand-alone operation instruction to the control apparatus 20-2.

When detecting a stand-alone-only recording medium, the storage system 1 according to the first embodiment registers the PV of the recording medium as an LV and automatically switches to the stand-alone mode. In this operation, the operator needs to insert or eject a stand-alone-only recording medium m.

In contrast, the storage system 1-2 according to the second embodiment registers the PV of the recording medium as an LV and automatically switches to the stand-alone mode by using a stand-alone-only recording medium EM stored in the storage apparatus 10. Namely, in this operation, the operator does not need to insert or eject any stand-alone-only recording medium EM.

Thus, the operator does not need to perform complex setup steps when operating the control apparatus 20-2 in the stand-alone mode, and the operator's work load is reduced. Namely, the operator's setup operations for the stand-alone are simplified.

Next, a specific exemplary configuration of a storage system according to the second embodiment will be described. A specific exemplary configuration of the storage system according to the second embodiment is the same as that of the storage system 1-1 according to the first embodiment illustrated in FIG. 2. The storage system according to the second embodiment includes a library apparatus 10a, a virtual tape apparatus 2-3, and a host apparatus 3, as with the storage system 1-1 according to the first embodiment. The second embodiment differs from the first embodiment in that the server 20a in the virtual tape apparatus 2 according to the first embodiment is replaced by a server 20a-3 according to the second embodiment.

Figure 18:
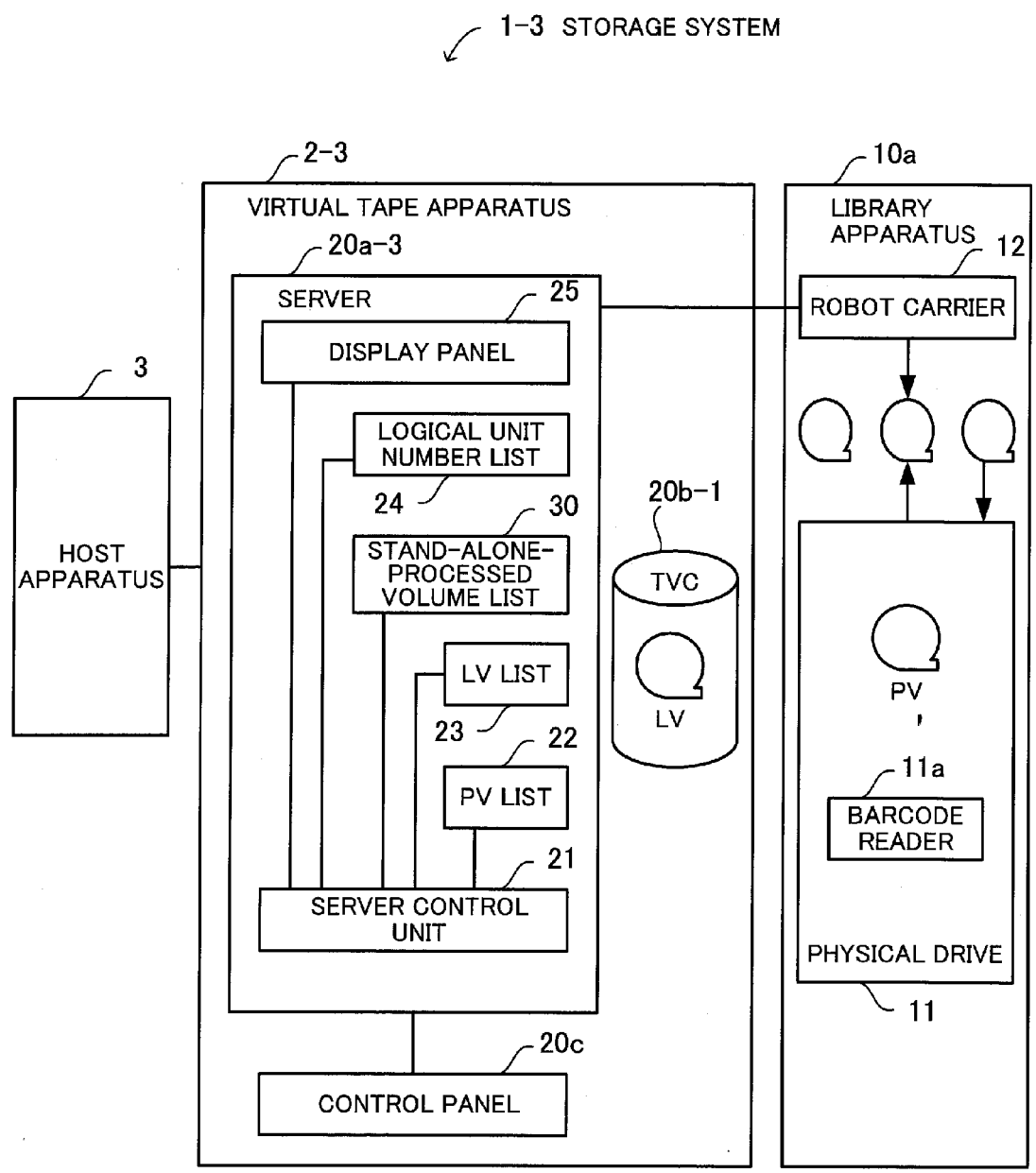
FIG. 18 illustrates an exemplary internal configuration of a library apparatus and of a server according to the second embodiment.

FIG. 18 illustrates an exemplary internal configuration of the library apparatus 10a and of the server 20a-3 according to the second embodiment. For simplicity, like elements are denoted by like reference characters between the first and second embodiments, and descriptions of these elements will be omitted.

The illustrated storage system 1-3 includes a library apparatus 10a, a virtual tape apparatus 2-3, and a host apparatus 3. While only one host apparatus 3 is illustrated, a plurality of host apparatuses 3 can be connected to the virtual tape apparatus 2-3. The virtual tape apparatus 2-3 includes the server 20a-3 and a disk array apparatus 20b including a plurality of HDDs. The server 20a-3 has functions corresponding to those of the control apparatus 20-2 illustrated in FIG. 17. In addition, the library apparatus 10a corresponds to the storage apparatus 10 in FIG. 17. The storage system 1-3 realizes a virtual tape library system.

The server 20a-3 performs control so that the storage system 1-3 operates as a hierarchical virtual tape library system in which the magnetic tapes in the library apparatus 10a are used as a back-end library and the HDDs in the disk array apparatus 20b are used as cache devices. The virtual tape apparatus 2-3 includes the server 20a-3 and a TVC 20b-1 (in FIG. 18, only the TVC 20b-1 is illustrated as a part of the disk array apparatus 20b as a storage area).

In addition, the virtual tape apparatus 2-3 includes a control panel 20c that is manually operated by an operator. The TVC 20b-1 is included in the disk array apparatus 20b in FIG. 2 and stores LV data. The control panel 20c provides the operator with a user interface for allowing the operator to manually perform operation settings of the server 20a-3, for example. The server 20a-3 includes a server control unit 21, a PV list 22, an LV list 23, a logical unit number list 24, a stand-alone-processed volume list 30, and a display panel 25. The server control unit 21 comprehensively controls the server 20a-3 and has the functions of the control unit 2b in FIG. 17. For example, the PV list 22, the LV list 23, the logical unit number list 24, and the stand-alone-processed volume list 30 are stored in the RAM 212, the flash memory 213, and the like illustrated in FIG. 16. In this case, the RAM 212, the flash memory 213, and the like storing the stand-alone-processed volume list 30 have the functions of the storage unit 2c illustrated in FIG. 17.

The PV list 22 is a list in which information about PVs is registered. The LV list 23 is a list in which information about LVs is registered. The logical unit number list 24 is a list in which information about logical unit numbers is registered. The stand-alone-processed volume list 30 is a list in which information about volumes on which stand-alone processing has been performed (stand-alone information) is registered. The details of the PV list 22, the LV list 23, and the logical unit number list 24 are as described in the first embodiment. An exemplary configuration of the stand-alone-processed volume list 30 will be described in detail below with reference to FIG. 19. For example, the display panel displays information about operations of the storage system 1-3 to the operator.

FIG. 19 illustrates an exemplary configuration of the stand-alone-processed volume list 30 according to the second embodiment. The stand-alone-processed volume list 30 includes columns for "volume name," "LV storage location," "PV storage location," and "processing end date." In an entry under "volume name," volume identification information of the corresponding PV is indicated. In an entry under "PV storage location," address information about where the corresponding PV is stored in the physical drive 11 is indicated. In an entry under "LV storage location," address information about where the corresponding LV is stored in the TVC 20b-1 is indicated. In an entry under "processing end date," a date of the end of the last stand-alone processing is indicated. The processing end date may include processing end time. For example, the stand-alone-processed volume list 30 includes a volume whose volume name is IPL000. This entry indicates that the LV is stored at XXX1, the PV is stored at YYY1, and the processing end date (the date of the end of the last stand-alone processing) is Y1M1D1.

Next, a stand-alone start operation and a stand-alone end operation in the stand-alone mode according to the second embodiment will be described in detail. Since the stand-alone job operations are the same as those in the stand-alone mode according to the first embodiment, description of the operations will be omitted. First, a stand-alone start operation will be described with reference to FIG. 20.

Figure 20:
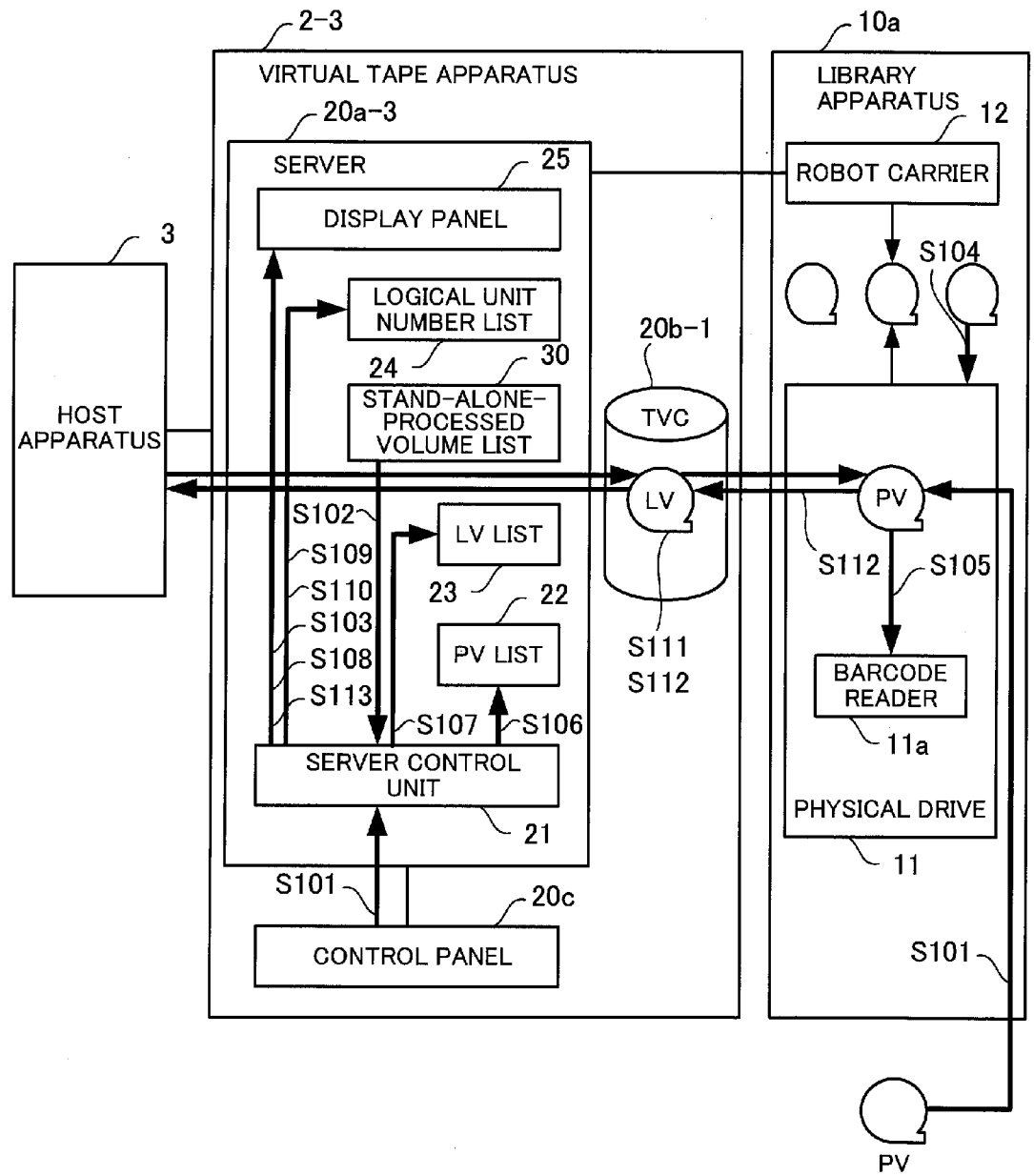
FIG. 20 illustrates a flow of a stand-alone start operation according to the second embodiment.

FIG. 20 illustrates a flow of a stand-alone start operation according to the second embodiment.

[S101] The server control unit 21 detects input of a stand-alone start command from the control panel 20c or mounting of a stand-alone-only recording medium into the physical drive 11. If the server control unit 21 detects input of a stand-alone start command, the server control unit 21 performs step S102. If the server control unit 21 detects mounting of a stand-alone-only recording medium into the physical drive 11, the server control unit performs step S105. The stand-alone start command includes a specified volume name and is entered by the operator via the control panel 20c, for example.

[S102] The server control unit 21 refers to the stand-alone-processed volume list 30 to determine whether the stand-alone-processed volume list 30 includes the volume name specified in the stand-alone start command. If the stand-alone-processed volume list 30 does not include the volume name specified in the stand-alone start command, the server control unit 21 causes the display panel 25 to display an error message.

[S103] If the stand-alone-processed volume list includes the volume name specified in the stand-alone start command, the server control unit 21 determines whether a PV corresponding to the specified volume name is stored in the library apparatus 10a. The server control unit 21 can determine the location of such PV corresponding to the specified volume name by referring to the stand-alone-processed volume list 30. If no PV corresponding to the specified volume name is stored in the library apparatus 10a, the server control unit 21 causes the display panel 25 to display an error message and does not start any stand-alone operation.

[S104] The server control unit 21 mounts the PV corresponding to the specified volume name into the physical drive 11. For example, if the physical drive 11 is a tape drive, the server control unit 21 loads the stand-alone-only recording medium into the tape drive.

[S105] After confirming that the PV corresponding to the specified volume name has been mounted into the physical drive 11, the server control unit 21 acquires the volume name of the PV read by a barcode reader 11a.

[S106] If a stand-alone-only label is pasted to the PV and if the volume name of the PV is not registered in the PV list 22, the server control unit 21 registers the volume name of the PV in the PV list 22.

[S107] If a stand-alone-only label is pasted to the PV and if the volume name of the LV is not registered in the LV list 23, the server control unit 21 registers the LV in the LV list 23 by using the volume name of the PV as the volume name of the LV.

[S108] If the label read by the barcode reader 11a is not a stand-alone-only label, the server control unit 21 causes the display panel 25 to display an error message and does not start any stand-alone operation. In addition, if the read volume name of the PV is already registered in the PV list 22 or the LV list 23, the server control unit 21 causes the display panel 25 to display an error message and does not start any stand-alone operation.

[S109] The server control unit 21 allocates a logical unit number that is not used in the logical unit number list 24.

[S110] The server control unit 21 sets the stand-alone mode flag corresponding to the allocated logical unit number to ON on the logical unit number list 24.

[S111] The host apparatus 3 mounts the LV to the allocated logical unit number.

[S112] If the volume name indicates IPLnnn, the server control unit 21 copies the data of the PV to the LV.

[S113] The server control unit 21 causes the display panel 25 to display information representing the end of preparation of the stand-alone mode.

In this way, regarding the first stand-alone processing on a stand-alone-only recording medium, the storage system 1-3 performs a stand-alone start operation in the same way as that according to the first embodiment. However, regarding the subsequent stand-alone processing, in the storage system 1-3, the operator does not need to insert the stand-alone-only recording medium into the storage apparatus 10.

Thus, in the storage system 1-3, the operator performs less troublesome work. Namely, the operator performs more simplified setup operations for the stand-alone mode.

Figure 21:
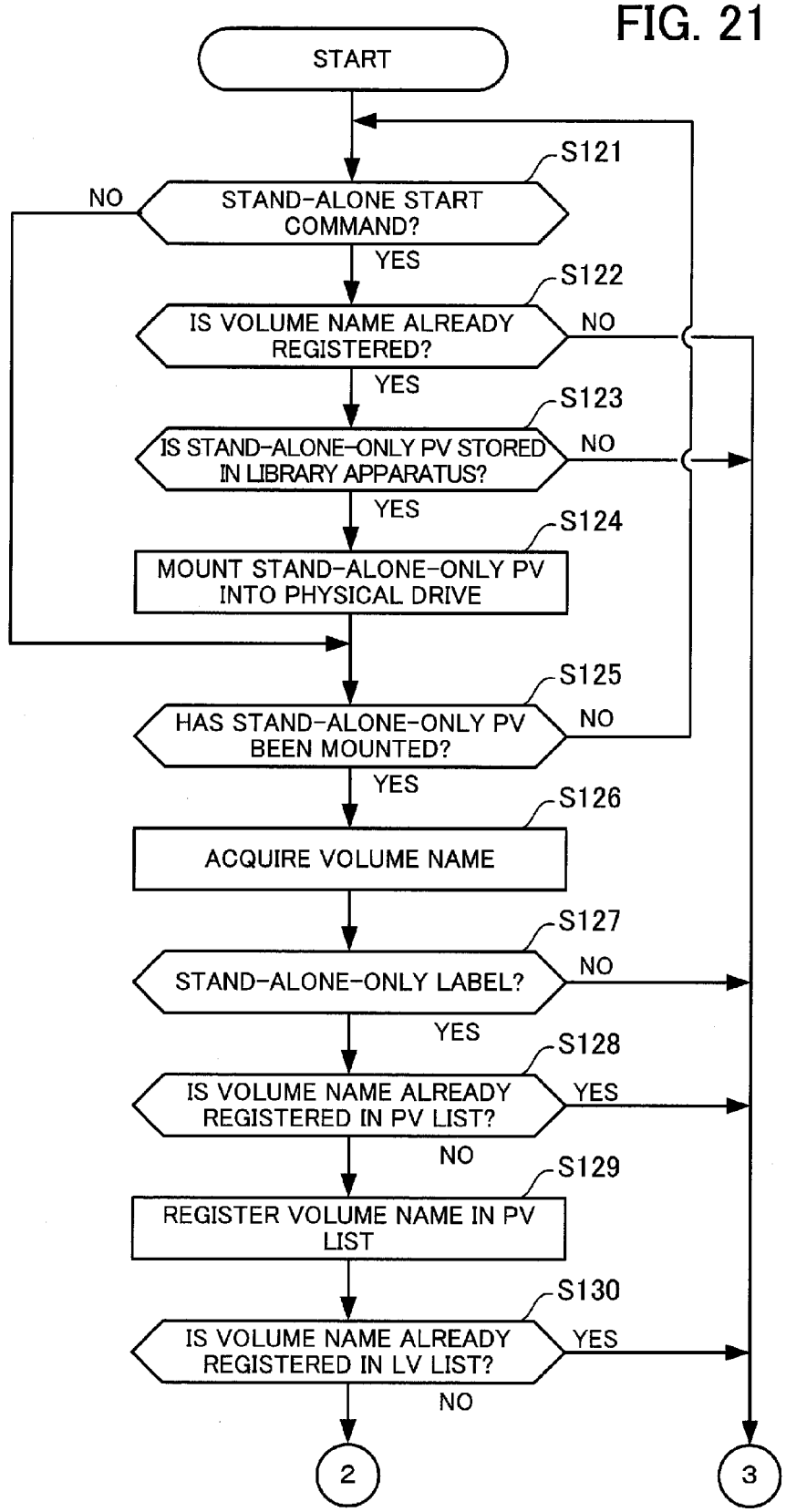
FIGS. 21 and 22 are flowcharts illustrating the stand-alone start operation according to the second embodiment.
Figure 22:
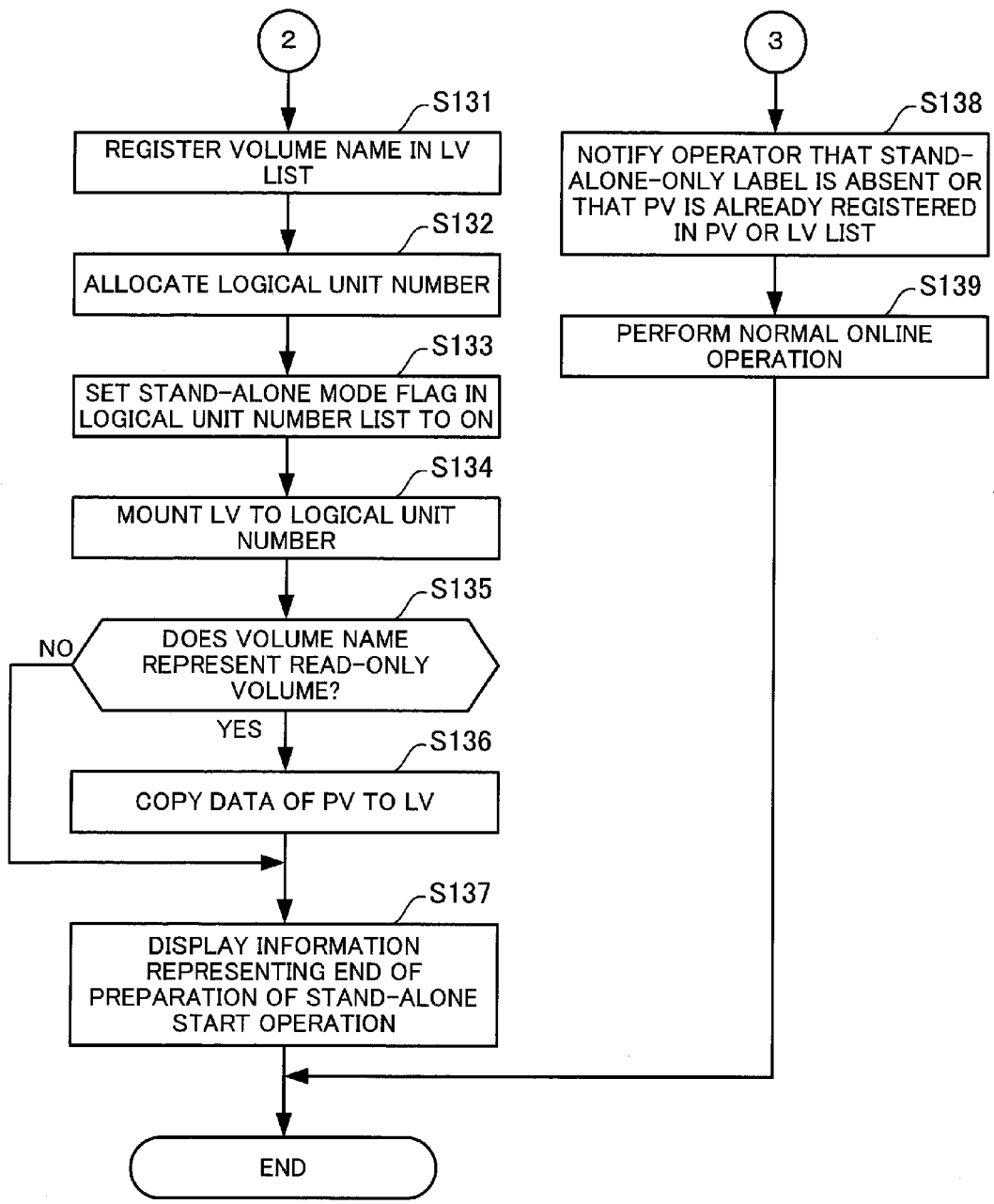

Next, processing for the stand-alone start operation performed by the server control unit 21 will be described with reference to FIGS. 21 and 22. FIG. 21 and are flowcharts illustrating the stand-alone start operation according to the second embodiment.

[S121] The server control unit 21 determines whether a stand-alone start command has been input. If the server control unit 21 detects input of a stand-alone start command, the server control unit 21 performs step S122. Otherwise, the server control unit 21 performs step S125.

[S122] The server control unit 21 determines whether the volume name specified in the stand-alone start command is already registered in the stand-alone-processed volume list 30. If the volume name specified in the stand-alone start command is registered in the stand-alone-processed volume list 30, the server control unit 21 performs step S123. Otherwise, the server control unit 21 performs step S138.

[S123] The server control unit 21 determines whether a PV corresponding to the specified volume name (a stand-alone-only PV) is stored in the library apparatus 10a. If this stand-alone-only PV is stored in the library apparatus 10a, the server control unit 21 performs step S124. Otherwise, the server control unit 21 performs step S138.

[S124] The server control unit 21 mounts the stand-alone-only PV into the physical drive 11.

[S125] The server control unit 21 determines whether a stand-alone-only PV has been mounted into the physical drive 11. If a stand-alone-only PV is mounted into the physical drive 11, the server control unit 21 performs step S126. Otherwise, the server control unit 21 performs step S121.

[S126] The server control unit 21 acquires the volume name of the PV read by the barcode reader 11a.

[S127] The server control unit 21 determines whether the label read by the barcode reader 11a is a stand-alone-only label. If the label read by the barcode reader 11a is a stand-alone-only label, the server control unit 21 performs step S128. Otherwise, the server control unit 21 performs step S138.

[S128] The server control unit 21 determines whether the volume name of the stand-alone-only PV is already registered in the PV list 22. If the volume name of the stand-alone-only PV is registered in the PV list 22, the server control unit 21 performs step S138. Otherwise, the server control unit 21 performs step S129.

[S129] The server control unit 21 registers the volume name of the stand-alone-only PV in the PV list 22.

[S130] The server control unit 21 determines whether the volume name of the stand-alone-only PV is already registered in the LV list 23. If the volume name of the stand-alone-only PV is registered in the LV list 23, the server control unit 21 performs step S138. Otherwise, the server control unit 21 performs step S131.

[S131] The server control unit 21 registers the volume name of the stand-alone-only PV in the LV list 23. For example, if the volume name of the stand-alone-only PV is IPL000, IPL000 is registered as the volume name of the LV in the LV list 23 (see FIG. 7).

[S132] The server control unit 21 allocates a logical unit number that is not used in the logical unit number list 24 to the LV registered in the LV list 23 in step S130.

[S133] The server control unit 21 sets the stand-alone mode flag corresponding to the LV registered in the logical unit number list 24 to ON.

[S134] The server control unit 21 mounts the LV to the allocated logical unit number. At this point, for example, if the volume name of the LV is IPL000 and the allocated logical unit number is 0000, the logical unit number is set to 0000, the ONL/OFL flag is set to OFL, the name of the LV mounted is set to IPL000, and the stand-alone mode flag is set to ON in the logical unit number list 24 (see FIG. 8).

[S135] The server control unit 21 determines whether the volume name of the stand-alone-only label pasted to the PV is IPLnnn (namely, whether the volume name represents a read-only volume). If the volume name of the stand-alone-only label pasted to the PV is IPLnnn, the server control unit 21 performs step S136. Otherwise, the server control unit 21 performs step S137.

[S136] The server control unit 21 copies the data of the PV to the LV.

[S137] The server control unit 21 causes the display panel 25 to display information representing the end of preparation of the stand-alone start operation (preparation of the stand-alone start operation is ended).

[S138] The server control unit 21 notifies the operator that a stand-alone-only label is not pasted to the PV or that the PV is already registered in the PV list or the LV list 23. For example, when notifying the operator of such information, the server control unit 21 causes the display panel 25 to display information about the PV read by the barcode reader 11a as well (the volume name, etc.).

[S139] The server control unit 21 does not start the stand-alone operation but performs a normal online operation.

As described above, when the first stand-alone is started, the operator loads a PV, to which a stand-alone-only label as illustrated in FIG. 4 is pasted, into the physical drive 11. However, when the subsequent stand-alone is started, the operator does not need to load the PV, to which a stand-alone-only label is pasted, into the physical drive 11.

When the server control unit 21 subsequently detects that a PV has been set, if the label is not a stand-alone-only label, the server control unit 21 does not switch the operation mode to the stand-alone mode but performs a normal online operation. Even if the label is a stand-alone-only label, if the volume name of the label is already registered, the server control unit 21 does not switch to the stand-alone mode but performs a normal online operation.

In contrast, if the label is a stand-alone-only label and if the volume name of the label is not registered yet, the server control unit 21 registers the LV by using the volume name of the PV as the volume name of the LV, allocates an unused logical unit number, and sets the allocated logical unit number in the stand-alone mode (sets the stand-alone mode flag in the logical unit number list 24 to ON). Next, the server control unit 21 mounts the LV to the allocated logical unit number.

Controlled in this way, the virtual tape apparatus 2-3 appropriately recognizes a stand-alone-only recording medium and automatically switches to the stand-alone mode.

In this way, only for the first stand-alone processing, the operator needs to load a PV to which a stand-alone-only label is pasted. For the subsequent processing, the operator only needs to input a stand-alone start command to set the stand-alone mode. Thus, the setup operations are simplified.

In addition, when a conventional virtual tape apparatus is set to the stand-alone mode, since complex setup operations are needed, setting errors easily occur, whereby a failure could occur. However, according to the second embodiment, since the virtual tape apparatus 2-3 switches to the stand-alone mode by a simple setting, such setting errors are eliminated. Thus, the possibility of occurrence of a failure is reduced. In addition, according to the second embodiment, after the first stand-alone processing, the operator does not need to insert the same stand-alone-only recording medium into the storage apparatus 10. Thus, according to the second embodiment, the operator performs less troublesome work. Namely, the operator performs more simplified setup operations for the stand-alone mode.

Figure 23:
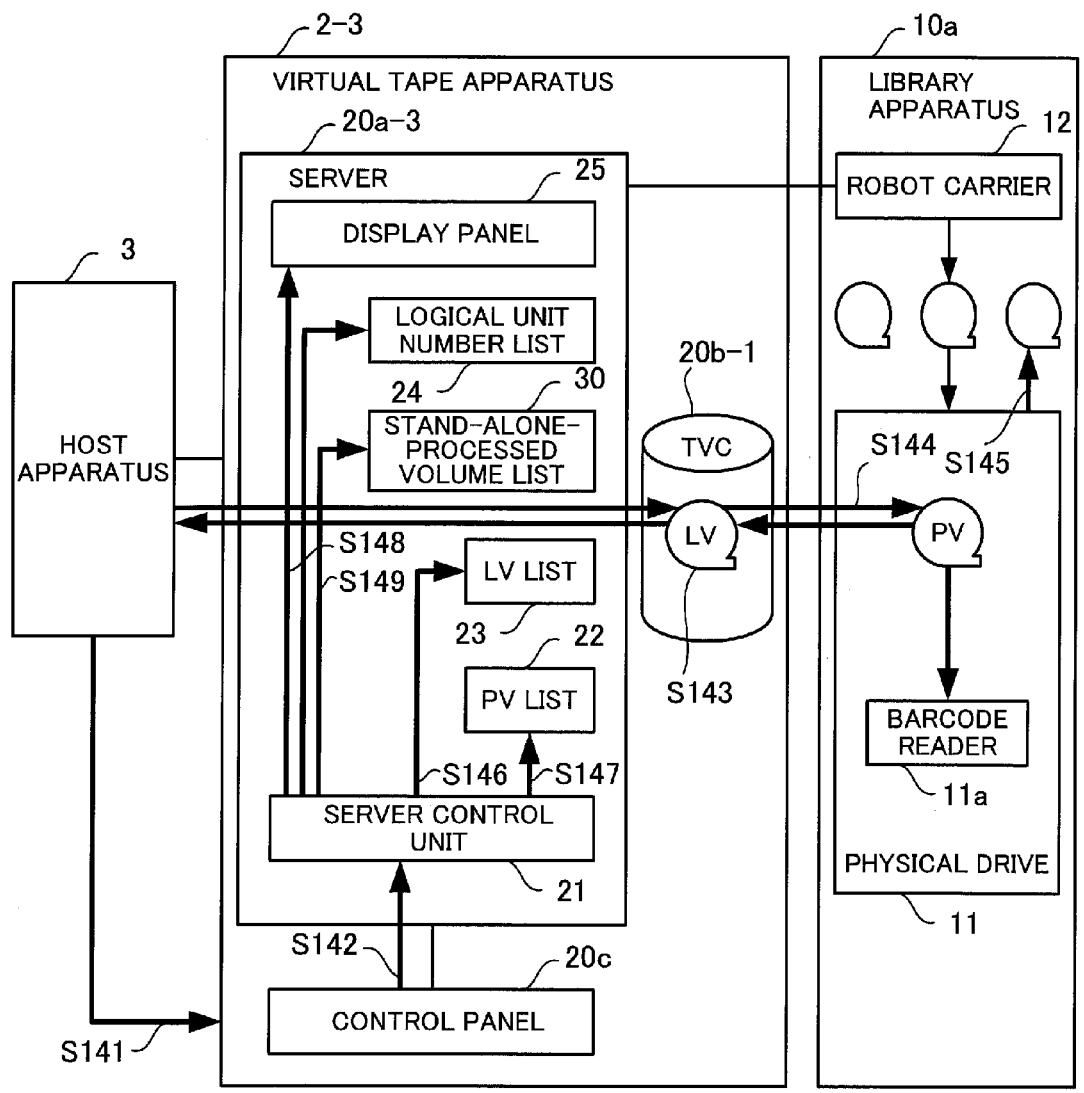
FIG. 23 illustrates a flow of a stand-alone end operation according to the second embodiment.

Next, a stand-alone end operation will be described with reference to FIG. 23. FIG. 23 illustrates a flow of a stand-alone end operation according to the second embodiment.

[S141] The console of the host apparatus 3 recognizes the end of a stand-alone job operation.

[S142] In response to an operation by the operator, the control panel 20c of the virtual tape apparatus 2-3 specifies a logical unit number and instructs the end of the stand-alone mode operation.

[S143] The server control unit 21 unmounts the LV corresponding to the specified logical unit number.

[S144] The server control unit 21 copies the data of the LV to the PV if the volume name of the LV is DMPnnn.

[S145] The server control unit 21 unloads the PV from the physical drive 11 and stores the unloaded PV in the library apparatus 10a.

[S146] The server control unit 21 deletes the registered information about the LV from the LV list 23.

[S147] The server control unit 21 deletes the registered information about the PV from the PV list 22.

[S148] The server control unit 21 sets the stand-alone mode flag in the logical unit number list 24 to OFF and causes the display panel 25 to display information representing the end of the stand-alone mode.

[S149] The server control unit 21 creates the stand-alone-processed volume list 30. If the stand-alone-processed volume list 30 has already been created, the server control unit 21 updates the stand-alone-processed volume list 30. By registering information about the stand-alone-only PV used in the stand-alone mode, the server control unit 21 creates or updates the stand-alone-processed volume list 30. More specifically, the server control unit 21 registers the volume name, the LV storage location, the PV storage location, and the processing end date of the stand-alone-only PV in the stand-alone-processed volume list 30.

In this way, in the storage system 1-3, the operator does not need to eject the stand-alone-only recording medium from the library apparatus 10a after the end of the stand-alone processing. In addition, in the storage system 1-3, the operator does not need to insert the stand-alone-only recording medium into the storage apparatus 10 after the first stand-alone processing. Thus, in the storage system 1-3, the operator performs less troublesome work. Namely, the operator performs more simplified setup operations for the stand-alone mode.

Figure 24:
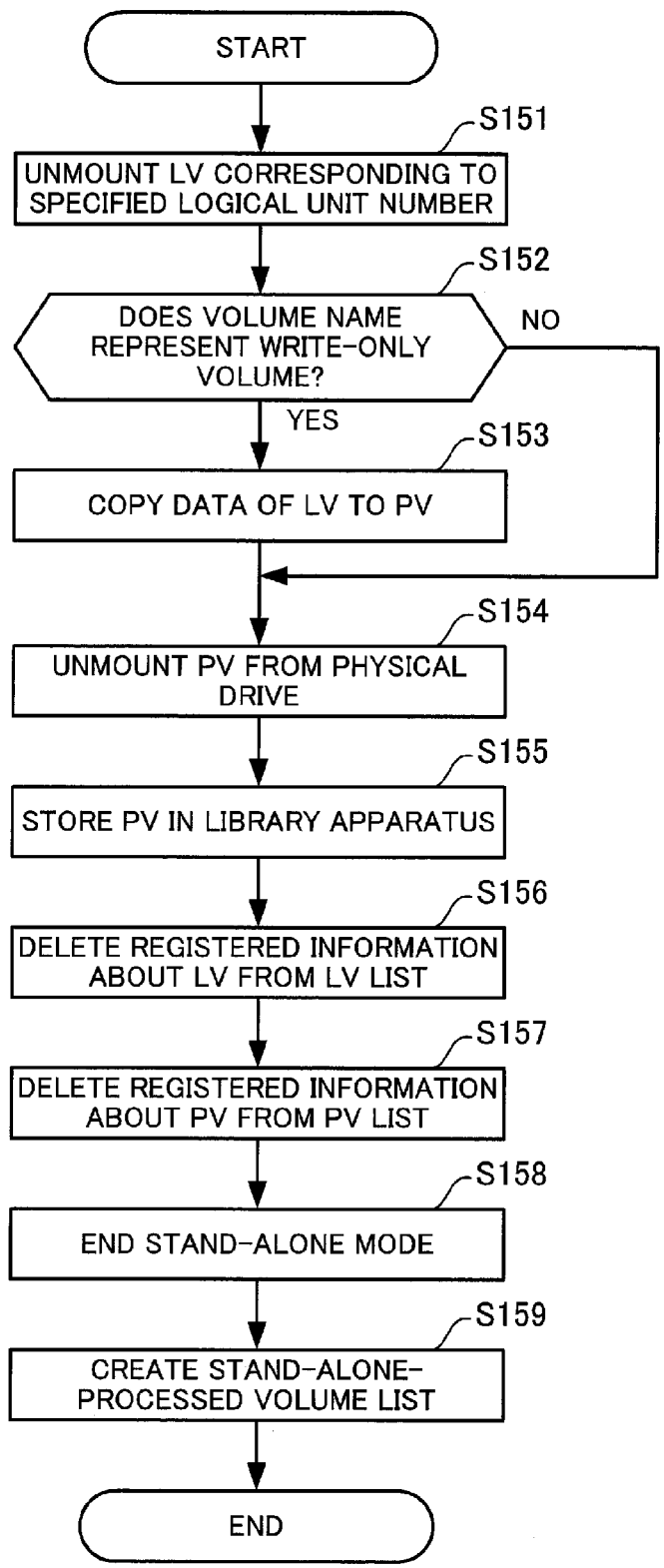
FIG. 24 is a flowchart illustrating the stand-alone end operation according to the second embodiment.

Next, processing for the stand-alone end operation performed by the server control unit 21 will be described with reference to FIG. 24. FIG. 24 is a flowchart illustrating the stand-alone end operation according to the second embodiment. The server control unit 21 performs the stand-alone end operation when detecting input of a stand-alone end command.

[S151] The server control unit 21 unmounts the LV corresponding to the specified logical unit number.

[S152] The server control unit 21 determines whether the volume name is DMPnnn (namely, whether the volume name represents a write-only volume). If the volume name is DMPnnn, the server control unit 21 performs step S153. Otherwise, the server control unit 21 performs step S154.

[S153] The server control unit 21 copies the data of the LV to the PV.

[S154] The server control unit 21 unmounts the PV from the physical drive 11.

[S155] The server control unit 21 stores the unmounted PV in the library apparatus 10a.

[S156] The server control unit 21 deletes the registered information about the LV from the LV list 23.

[S157] The server control unit 21 deletes the registered information about the PV from the PV list 22.

[S158] The server control unit 21 ends the stand-alone mode. When ending the stand-alone mode, the server control unit 21 removes the allocated logical unit number from the logical unit number list 24, sets the stand-alone mode flag in the logical unit number list 24 to OFF, and causes the display panel 25 to display information representing the end of the stand-alone mode.

[S159] The server control unit 21 creates the stand-alone-processed volume list 30 and ends the processing for the stand-alone end operation.

As described above, when ending the stand-alone operation, the server control unit 21 of the virtual tape apparatus 2-3 unmounts the LV in the virtual tape apparatus 2-3. If the volume name represents a write-only label, the server control unit 21 copies the data of the LV to the PV. After storing the unmounted PV in the library apparatus 10a, the server control unit 21 deletes the registered information about the LV and the PV from the LV list 23 and the PV list 22 and sets the stand-alone mode flag in the logical unit number list 24 to OFF.

In the storage system 1-3 controlled in this way, to automatically end the stand-alone mode, the operator only needs to specify a logical unit number for which the operator wishes to end the stand-alone mode. Namely, since the stand-alone end processing is easily performed. In addition, switching to the normal online operation is promptly performed. In addition, the operator does not need to eject the same stand-alone-only recording medium from the library apparatus 10*a* each time the operator ends a stand-alone operation. Thus, in the storage system 1-3, the operator does not need to insert the stand-alone-only recording medium into the storage apparatus 10 after the first stand-alone processing. Therefore, in the storage system 1-3, the operator performs less troublesome work. Namely, the operator performs more simplified setup operations for the stand-alone mode. In addition, in the storage system 1-3, if the operator uses the same stand-alone-only recording medium in the DMP operation, the operator does not need to insert and eject the stand-alone-only recording medium each time the operator performs the DMP operation. Thus, in the storage system 1-3, since the operator can perform the DMP operation with more simplified operations, the operator's work burden is reduced. In addition, in the storage system 1-3, the operator can separately use stand-alone-only recording media of a plurality of generations in the IPL operation easily. Thus, in the storage system 1-3, since the operator can perform the IPL operation with more simple operations, the operator's work burden is reduced.

The hardware configuration of the virtual tape apparatus 2-3 is realized as the same computer as that illustrated in FIG. 16 used for the virtual tape apparatus 2. With the above hardware configuration, the processing functions according to the second embodiment can be realized. In addition, if a computer is used to realize the processing functions according to the second embodiment, the computer is provided with a program in which the processing contents of the functions of the virtual tape apparatus 2-3 are written. By causing the computer to execute the program, the above processing functions are realized on the computer. The program in which the processing contents are written can be recorded in a computer-readable recording medium.

As described above, according to the second embodiment, by using stand-alone-only labels, volumes used in stand-alone jobs are distinguished from volumes used in normal jobs. Thus, operational errors are reduced. In addition, when an unregistered PV, to which a stand-alone-only label is pasted, is mounted, the virtual tape apparatus 2-3 automatically recognizes the start of a stand-alone operation mode and performs a predetermined sequence operation. In addition, the virtual tape apparatus 2-3 prevents other hosts from using logical unit numbers being used in stand-alone jobs. In this way, since logical unit numbers used in stand-alone jobs and logical unit numbers used in normal online jobs are distinguished, destruction of data caused by double allocation or the like is prevented.

In addition, since the operator does not need to insert and eject the same stand-alone-only recording medium each time the operator performs a stand-alone operation, the operator's work burden is reduced in the storage system 1-3. Namely, stand-alone setup operations performed by the operator are simplified.

While an embodiment has thus been described as an example, the configuration of each element illustrated in the embodiment may be replaced by another configuration having an equivalent function. In addition, other components or steps may be added. In an aspect of the second embodiment, the setup operations can be further simplified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
 a storage apparatus that performs reading or writing data on recording media; and
 a control apparatus that includes a controller which registers, when detecting that a recording medium loaded into the storage apparatus is a stand-alone-only recording medium that is used in a stand-alone mode, a physical volume of the stand-alone-only recording medium as a logical volume and switches an operation mode to the stand-alone mode.

2. The storage system according to claim 1, wherein:
 after registering the physical volume of the stand-alone-only recording medium as a logical volume, the controller switches the operation mode to the stand-alone mode.

3. The storage system according to claim 2, wherein:
 the control apparatus includes a storage unit which stores registration information representing whether volume identification information is registered;
 when the controller determines that a label given to the recording medium is a stand-alone-only label and determines that volume identification information on the stand-alone-only label is not registered in the registration information, the controller recognizes that the recording medium is a stand-alone-only recording medium; and
 when the controller determines that the label is a stand-alone-only label and determines that volume identification information on the stand-alone-only label is registered in the register information, or when the controller determines that the label is not the stand-alone-only label, the controller recognizes that the recording medium is not a stand-alone-only recording medium and data processing of the recording medium is performed via another apparatus connected with the control apparatus.

4. The storage system according to claim 2, wherein:
 when a stand-alone mode start operation is performed, the controller uses volume identification information of the physical volume of the stand-alone-only recording medium as volume identification information of the logical volume, selects a logical unit number to be used in the stand-alone mode from unused logical unit numbers, and assigns the selected logical unit number to the logical volume.

5. The storage system according to claim 2, wherein:
 when data processing of the recording medium is being performed in the stand-alone mode, the controller guards the logical volume, to which a logical unit number used in the stand-alone mode has been allocated, from being accessed by hosts other than a host performing the data processing.

6. The storage system according to claim 2, wherein:
when ending the stand-alone mode for the logical volume, the controller unmounts the logical volume and copies changed data in the logical volume to the stand-alone-only recording medium.

7. The storage system according to claim 1, wherein:
the control apparatus includes a storage unit which stores stand-alone information in which volume names, physical volumes, and logical volumes of detected stand-alone-only recording media are associated with each other;
when receiving a stand-alone operation instruction specifying a volume name, the controller refers to the stand-alone information; and
when the volume name specified in the instruction matches a volume included in the stand-alone information and a stand-alone-only recording medium that is used in the stand-alone mode is stored in the storage apparatus in association with the volume, the controller registers the physical volume corresponding to the volume name specified in the instruction as a logical volume and switches the operation mode to the stand-alone mode.

8. The storage system according to claim 7, wherein:
the controller selects a logical unit number to be used in the stand-alone mode from unused logical unit numbers, and assigns the selected logical unit number to the logical volume.

9. The storage system according to claim 8, wherein:
when the stand-alone-only recording medium is a read-only recording medium, the controller copies data of the physical volume to the logical volume.

10. The storage system according to claim 7, wherein:
when ending the stand-alone mode, the controller stores the stand-alone-only recording medium in the storage apparatus and generates stand-alone information in which the volume name, the physical volume, and the logical volume of the stand-alone-only recording medium are associated with each other.

11. The storage system according to claim 10, wherein:
the controller unmounts the logical volume; and
when the stand-alone-only recording medium is a write-only recording medium, the controller copies data of the logical volume to the physical volume; and
the controller unmounts the physical volume.

12. The storage system according to claim 7, wherein:
the controller refers to the stand-alone information and when the volume specified in the instruction does not match any volume included in the stand-alone information or when the stand-alone-only recording medium that is used in the stand-alone mode is not stored in the storage apparatus in association with the volume, the controller outputs an error message.

13. A control apparatus comprising:
a processor that detects whether a recording medium loaded in a storage apparatus is a stand-alone-only recording medium that is used in a stand-alone mode and registers, when the recording medium is the stand-alone-only recording medium, a physical volume of the stand-alone-only recording medium as a logical volume and switches an operation mode to the stand-alone mode.

14. A non-transitory computer-readable recording medium storing a computer program that causes a computer to perform a procedure comprising:
detecting whether a recording medium loaded in a storage apparatus is a stand-alone-only recording medium that is used a stand-alone mode;
registering, when the recording medium is the stand-alone-only recording medium, a physical volume of the stand-alone-only recording medium as a logical volume; and
switching an operation mode to the stand-alone mode.

* * * * *